US006591306B1

(12) United States Patent
Redlich

(10) Patent No.: US 6,591,306 B1
(45) Date of Patent: Jul. 8, 2003

(54) IP NETWORK ACCESS FOR PORTABLE DEVICES

(75) Inventor: Jens-Peter Redlich, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/357,907

(22) Filed: Jul. 21, 1999

Related U.S. Application Data

(60) Provisional application No. 60/127,623, filed on Apr. 1, 1999.

(51) Int. Cl.[7] ............................................. G06F 15/16
(52) U.S. Cl. ........................ 709/245; 370/401; 370/466
(58) Field of Search ................................. 709/201, 203, 709/220, 227, 228, 238, 245, 222; 370/401, 262, 466; 713/201, 150

(56) References Cited

U.S. PATENT DOCUMENTS

| 5,410,543 | A | | 4/1995 | Seitz et al. ............... 370/85.13 |
| 5,412,654 | A | | 5/1995 | Perkins et al. .............. 370/94.1 |
| 5,596,723 | A | * | 1/1997 | Romohr ...................... 709/222 |
| 5,598,536 | A | | 1/1997 | Slaughter, III et al. . 395/200.16 |
| 5,692,124 | A | * | 11/1997 | Holden et al. ............... 713/201 |
| 5,708,654 | A | * | 1/1998 | Arndt et al. ................. 370/242 |
| 5,757,924 | A | | 5/1998 | Friedman et al. ............. 380/49 |
| 5,790,548 | A | | 8/1998 | Sistanizadeh et al. ....... 370/401 |
| 5,835,725 | A | | 11/1998 | Chiang et al. |
| 5,852,721 | A | * | 12/1998 | Dillon et al. ................ 709/227 |
| 5,854,901 | A | * | 12/1998 | Cole et al. .................. 709/245 |
| 6,061,739 | A | * | 5/2000 | Reed et al. .................. 709/245 |
| 6,070,187 | A | * | 5/2000 | Subramaniam et al. ..... 709/220 |
| 6,130,892 | A | * | 10/2000 | Short et al. .................. 370/401 |
| 6,167,513 | A | * | 12/2000 | Inoue et al. ................. 713/150 |
| 6,189,042 | B1 | * | 2/2001 | Keller-Tuberg ............. 709/238 |
| 6,324,580 | B1 | * | 11/2001 | Jindal et al. ................ 709/228 |

OTHER PUBLICATIONS

Lnux, NET–3–HOWTO, 6.Network Technology Specific Information. www.ampr.torun.pl/book/net/NET–3–HOWTO–6.html.*
Park et al, The Operation of IP and Address Resolution over the ATM LAN Internetworking Unit. IEEE 1996.*
Internet White Paper: *Enabling Enterprise Multihoming with Cisco IOS Network Address Translation (NAT)*, P. Akkiraju, K. Delgadillo, Y. Rekhter (Undated; Downloaded Jun. 25, 1999).
IPORT Internet Access System Resource Guide—Overview of the IPORT System for Hotels & MDUs; May 7, 1999, ATCOM, Inc.
"New room–service fare: High speed Internet Access", p. 38, Network World, Inc., Dec. 7, 1998.
"IPORT Ready for Worldwide Deployment; Commercial Trials for the High–Speed Internet Access Solution a Success; Global Channel of IPORT Resellers in Place"; PR Newswire, Jun. 17, 1998.

* cited by examiner

Primary Examiner—Mark R. Powell
Assistant Examiner—Thong Vu
(74) Attorney, Agent, or Firm—Sughrue Mion, PLLC

(57) ABSTRACT

A guest station on a foreign network is provided IP access by the foreign (i.e., hosting) network without changes to the guest station, including settings for IP address, next-hop-router (gateway), and netmask. An access router automatically detects guests and their home-IP-address and assigns a local care-of address to every guest. For outgoing traffic, the router replaces the guest's original/home IP address with the care-of address, and the reverse is performed for incoming traffic. IP traffic may thus be initiated, and responses received at the temporary current location without having to change its IP address.

26 Claims, 20 Drawing Sheets

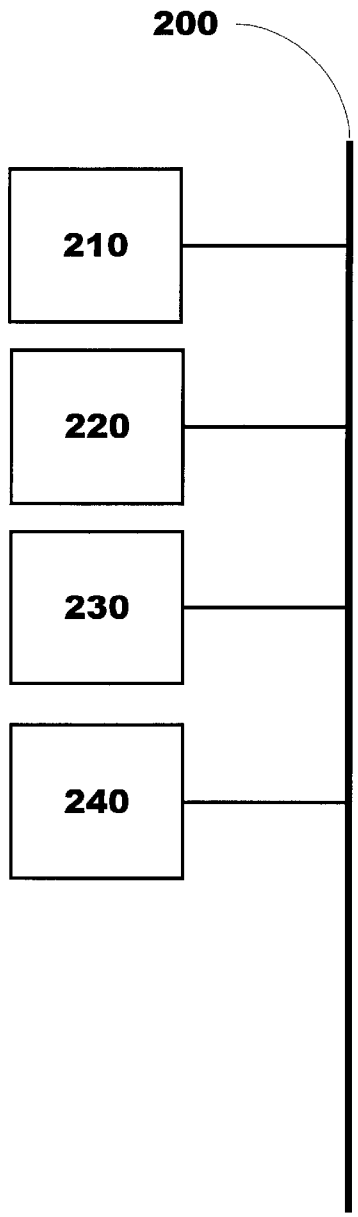
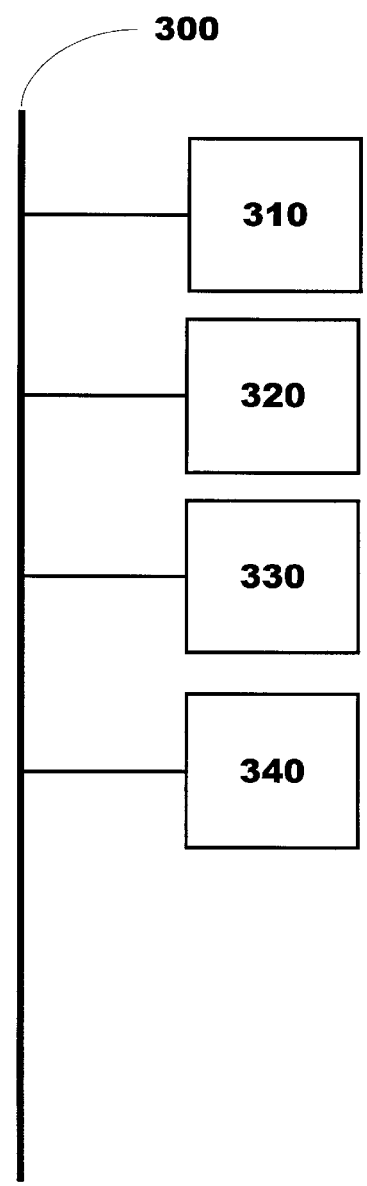
Fig. 3 PRIOR ART

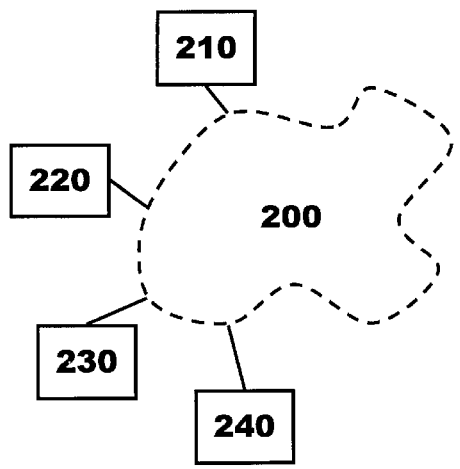
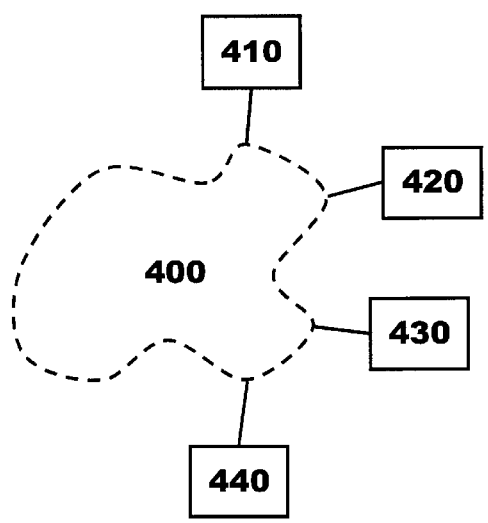
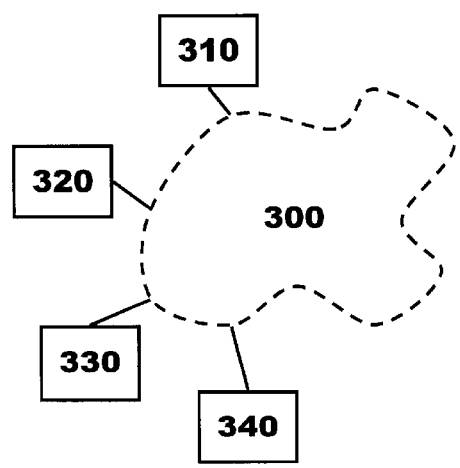
Fig. 4
PRIOR ART

Fig. 7
PRIOR ART

| 0 | ver. | IHL | TOS | total length |
|---|------|-----|-----|--------------|
| 4 | \multicolumn{2}{c}{packet id} | | fragmentation offset |
| 8 | ttl | | protocol | IP checksum |
| 12 | \multicolumn{3}{c}{source address} | | |
| 16 | \multicolumn{3}{c}{destination address} | | |
| 20 | \multicolumn{3}{c}{workload} | | |

Fig. 12

```
                    # file / etc/ppp/options mppe                # require MPPE encryption auth                # require both sides to
                    authenticate each other require-chap        # use MS-CHAP for authentication local               # turn off modem control proxyarp            # proxy-ARP for remote tunnel
                    endpoint
```

Fig. 13

```
file   / etc/ppp/chap-secrets client-login   server-machine   password   allowed-client-machines redlich            serv.xyz.com     mypass1    128.3.4.5 redlich            serv.xyz.com     mypass2    128.9.8.7
```

Fig. 14

```
#   /etc/inetd.conf

...

pptp  stream  tcp  nowait  root    /usr/sbin/pptp_server

```
#    /etc/services
...
pptp    1723/tcp              # Point-to-Point Tunneling Protocol
...
```

Fig. 16

```
ifconfig tun10 128.1.1.1 pointopoint 128.2.2.2 ifconfig tun10 128.2.2.2 pointopoint 128.1.1.1 route <c/o-addr> gw 128.1.1.1 tun10  * for each c/o address
```

IP NETWORK ACCESS FOR PORTABLE DEVICES

CROSS REFERENCE TO RELATED APPLICATIONS

This application is an application filed under 35 U.S.C. §111(a) claiming benefit pursuant to 35 U.S.C. §119(e)(1) of the filing date of the Provisional Application No. 60/127,623 filed on Apr. 1, 1999 pursuant to 35 U.S.C. §111(b). The Provisional Application No. 60/127,623 is incorporated by reference in its entirety.

BACKGROUND OF THE INVENTION

1. Field of the Invention

This invention relates to an intelligent router. More particularly, this invention relates to a router that is useful for providing internet access to a foreign or a guest station on a local network. This invention relates, even more particularly, to a computer system that acts as a routing apparatus, to a method of routing, to a method of intercepting IP packets from computers with unknown IP configuration, to a method of adapting intercepted IP traffic to a local network configuration, to a method of protecting the local network from malicious guest computers, to a network interface, and to a computer program product adapted to provide IP network access to a guest station.

2. Related Technology

For the sake of clarity, some background information will now be provided. A discussion of digital computers is provided first, followed by an explanation of computer systems and computer program products. After that, computer communications and networks are discussed.

After this foundation is provided, a problem is described with respect to networking and portable devices. To complete this description of related technology, one or more prior solutions to the problem are then discussed.

Digital Computers

Digital computers have made possible many changes in the scientific, industrial, and commercial arenas. Today, many businesses cannot function without the aid of working information systems. Many special-purpose and general-purpose computers are well-known.

A block diagram of a simple general-purpose digital computer is shown in FIG. 1, although the drawing figure could also pertain equally well to a special-purpose digital computer, depending on the functionality provided. Reference numeral 10 indicates the general-purpose digital computer. Such a computer may include a central processing unit 100, also referred to as a CPU. The main memory 110 may be understood to be a RAM. The computer in this simplified diagram has only one I/O processor 120. The I/O processor 120 controls I/O devices 130. The I/O devices 130 may include a display, a keyboard, a printer, a disk drive, a mouse, and a network adapter 140, such as an Ethernet card or the like. It will be understood that this diagram is for explanatory purposes only, and is not intended in any way to limit the invention.

The CPU 100 includes a control unit, an ALU, and registers. The control unit is responsible for fetching instructions from main memory 110 and determining their type. The ALU performs operations, such as addition and Boolean AND, needed to carry out the instructions. The registers of the CPU 100 provide a small, high-speed memory used to store temporary results and certain control information. The registers may each be designated a certain function, or may be general-purpose registers. Included in the registers is a program counter PC, which points to the next instruction to be executed. There is also an instruction register IR, which holds the instruction currently being executed.

It will be appreciated that the CPU 100, the main memory 110, and the I/O processor 120 are interconnected by buses. Communications between these different units takes place across the buses. Of course, the network adapter 140 or any of the other I/O devices 130 may be designed so as to function without the I/O processor and, instead, be connected to the same bus used by the other main modules. Additionally, it is possible to have multiple displays, multiple network adapters 140, and so on.

Thus, it can be seen that a digital computer is an interconnection of digital modules. There are modules within the CPU 100, and the CPU, the main memory 110, and the I/O processor 120 also may be thought of as modules themselves. On a larger scale, when these components are all included in the same container, this container may be understood to be a module, and the different I/O devices (such as display and keyboard) may be understood to be modules themselves.

Computer Systems and Computer Program Products

Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary for this discussion that the memory and the processor be physically located in the same place. That is to say, the processor and the memory might be in different physical pieces of equipment or even in geographically distinct locations.

The term "computer program product" will now be explained. On a practical level, the software that enables the computer system to perform desired operations may be supplied on any one of a variety of media. Furthermore, the actual implementation of computer operations may actually be statements written in a programming language. Such programming language statements, when executed by a computer, cause the computer to act in accordance with the particular content of the statements. Furthermore, the software that enables a computer system to act in a predetermined manner may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in a predetermined manner, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium may be referred to as "bearing" the software. Thus, the term "bearing" is intended to encompass the above and all equivalent ways in which software is associated with a computer usable medium. For the sake of simplicity, therefore, the term "program product" is thus used to refer to a computer useable medium, as defined above, which bears, in any form, software to enable a computer system to operate in a predetermined manner.

User Interfaces

A User interface may be invocable by a running program. A user interface may be understood to mean any hardware, software, or combination of hardware and software that allows any user to interact with a computer system. Most programs have many interfaces of different types, e.g. a graphical interface for the user, a command line interface, a control interface (based on CORBA, JAVA-RMI, DCE or some other protocol). Here, it will be appreciated that the term "user interface" means all of these taken together.

For the purposes of this discussion, a user interface may be understood to include one or more user interface objects. User interface objects may include display regions, user activatable regions, and the like.

As is well understood, a display region is a region of a user interface which displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. It is not necessary, however, for the purposes herein, that an actual user ever interacts with the user interface. It is also not necessary, for the purposes herein, that the interaction with a user interface be performed by an actual user. That is to say, it is foreseen that a user interface may have interaction with another program, such as a program created using macro programming language statements that simulate the actions of a user with respect to the user interface.

Computer Networking

FIG. 2 shows several computers of the type shown in FIG. 1 connected together in a network. In particular, computers 210, 220, 230, and 240 participate in a first network 200 (a second network is discussed further below). In the arrangement shown in FIG. 2, the computers 210–240 attached to the first network 200 can all communicate with each other. The computers 210–240 may be referred to as stations participating in network 200. Furthermore, the computers 210–240 normally participate in this first network 200 and may be thought of as "regular stations" or "regular machines" of the network 200.

FIG. 3 shows the first network 200 and a second network 300. The second network 300 has several regular stations 310, 320, 330, and 340. Each of the stations 310–340 shown in FIG. 3 may be a digital computer 10 as shown in FIG. 1. The stations 310–340 can all communicate with each other by virtue of the second network 300, but cannot communicate with. any of the stations 210–240 of the first network 200, in the arrangement shown in FIG. 3. This is because there is no interconnection between network 200 and network 300.

Although it may be possible to put all of the stations 210–240 and 310–340 on a single, larger network, this is not always desirable or possible. A typical solution to effecting communication between networks is to provide some kind of connection between the networks that keeps the networks separate, but allows for communications to pass from one to the other.

FIG. 4 shows the first network 200 and the second network 300 in a more conceptual manner. In particular, networks 200 and 300 are represented by blobs with dashed lines in FIG. 4 so as to help focus the discussion away from any particular topology (such as that shown in FIGS. 2 and 3) and toward the concept of internetworking. A third network 400 and respective regular stations 410, 420, 430, and 440 also are shown.

FIG. 5 is similar to FIG. 4, except that the three networks 200, 300, 400 are shown connected to a network 500 which may be thought of as a network for interconnecting networks 200–400. Network 500 may, more specifically, be referred to as an inter-network. The first network 200 connects to inter-network 500 via access station 502. The second network 300 connects to the inter-network 500 via access station 503. The third network 400 connects to the inter-network 500 via access station 504. The inter-network 500 may be a network of any size, and may include switching nodes. In fact, the inter-network 500 may include many intermediate networks, such as is the case with the Internet.

A brief description of how the networks 200–400 and inter-network 500 operate will now be provided.

Computer Communications

In its simplest form, communications between computers may take place between two devices that are directly connected by some form of point-to-point transmission medium. Often, however, it is impractical for two devices to be directly, point-to-point connected. When devices are far apart, and it is too expensive to arrange for a dedicated link between the two devices, or when there is a set of devices, each of which may require a link to many of the others at various times, computer networking is the solution.

The individual stations 210–240, 310–340, and 410–440 may be referred to also as users, or machines, although other terms are equally acceptable. Stations may be any of several types of communicating digital computers, and are all in communication with an access node.

In a communication network, data may be transferred from source to destination through a series of intermediate nodes. These nodes are not concerned with the content of the data but exist to provide a forwarding facility that will move the data from node to node until the data reaches the destination. One kind of a network is a circuit-switched network. In a circuit-switched network, a dedicated communications path is established between two stations through the nodes of the network. On each link between the intermediate nodes, a logical channel is dedicated to the connection.

Another kind of network is a store-and-forward network, which may be referred to herein as a packet network. With a packet network, it is not necessary to dedicate transmission capacity along a path through the network. Instead, data are sent out in a sequence of small pieces called packets. Each packet is passed through the network from node to node. A participating node first receives the packet, stores it in memory, consults its forwarding table in order to determine an outbound network interface, and sends the packet through that interface to the next hop. The forwarding table is periodically computed by means of a routing protocol, such as RIP or OSPF. Packet-networks are commonly used in computer to computer communications.

A very high degree of cooperation between computer systems is required in order to communicate from a source computer (or source station) through a network to a destination computer (or destination station). The exchange of information between computers for the purpose of such cooperative action may be understood to be computer communications. Similarly, when two or more computers are interconnected via a communication network, the set of computer stations may be referred to in general as a computer network.

A protocol may be understood to refer to the set of rules governing the exchange of data between computers. Many different protocols may be in operation at any one time when two different computers are communicating with each other. In fact, the structured set of protocols that implement all of the different communications between computers may be referred to as a computer communications architecture. One example of a well-known computer communications architecture is the open systems interconnection (OSI) model. Another example is SNA. Yet another example, which relates to the Internet, is TCP/IP.

Addressing and routing are critical issues in a packet (i.e. store-and-forward) network. The primary function of a packet network, at its lowest level, may be understood to be accepting packets from a source station and delivering them to a destination station. More than one route from source to destination is typically possible, and a routing function must be performed. The selection of a route for a packet at a particular node may be understood to be the function of routing. An apparatus that is equipped with routing software and with hardware to forward packets between networks, according to the routes calculated by the routing software, may be referred to as a router. It should be noted, that for small routers, routes may be configured manually, and the routing software may be disabled.

FIG. 6 shows a router 600 connected between the first network 200 and the second network 300. A router may operate as follows. Assume that station 210 sends a packet addressed to station 310. Station 210 is said to be the source station and station 310 is said to be the destination station. The source station 210, which may be a digital computer 10 as shown in FIG. 1, transmits the packet to the network 200 via the network adapter 140. The router 600 may be configured with two network adapters 140: a first one participating in the first network 200 and a second one participating in the second network 300. The router 600 may receive the packet that station 210 transmitted. The router may recognize the address of the destination is station 310. The router 600 may keep tables in a memory, and these tables may contain information indicating that the destination station 310 is not a regular participant in the first network 200 (those tables, which are called forwarding tables or, interchangeably, routing tables, have been either manually configured or automatically calculated by the routing software by means of a routing protocol, such as RIP or OSPF). Having made a determination that the received packet is addressed to a station not participating in the first network 200, the router 600 may then transmit the packet through its second network adapter 140 on the second network 300. The packet is received by destination station 310 through its respective network adapter 140.

If the same packet had been transmitted by source station 210 but addressed to station 220 as a destination station, the router would have made a determination, from its forwarding table, that station 220 is a regular station of the first network 200 and would not have transmitted a copy of the packet on the second network 300.

It will be appreciated that one example of a packet network is an internet. A particular instance of an internet is the Internet. As used herein, the terms "an internet" and "the Internet" are generally interchangeable. The discussion here and below is not meant to be limited to the Internet, although the Internet used in most examples. Also, the term "data packet" or "packet of data" may be used interchangeably with "datagram".

Turning back to FIG. 5, it may be appreciated that access nodes 502, 503, and 504 may be digital computers 10 equipped to operate as routers 600. It will be appreciated that a router is a digital computer 10 that is able to participate in a predetermined manner in more than one network. The router 600 is a computer system adapted to perform predetermined routing operations in accordance with its computer instructions.

An Internet packet must bear a destination address in order to be delivered to that location. In this regard, there is a distinction that should be made between names and addresses. A name indicates an entity to which an address may pertain. That is, an address indicates the location of an entity which may have a name. The Internet protocol (IP) is a protocol that deals primarily with addresses.

In the above-identified OSI model, there are seven layers: the physical layer, the data link layer, the network layer, the transport layer, the session layer, the presentation layer, and the application layer. The transport layer is responsible for providing reliable, transparent transfer of data between endpoints; it is also responsible for providing end to end error recovery and flow control. There are two different transport level protocols commonly associated with the Internet. These two protocols include the transmission control protocol (TCP), which is connection oriented, and the user datagram protocol (UDP), which is connectionless. TCP is the principal transport protocol for the Internet.

The inter-network 500, which will be referred to hereafter as the Internet in examples, with the understanding that the examples are not limited to just the Internet, uses IP at the network layer, on top of which other, higher layer protocols are implemented, such as TCP, UDP and ICMP. Networks that use IP may be referred to as IP networks. Internet 500 is thus an IP network. It will also be assumed that networks 200, 300, and 400 also use IP.

TCP may be understood to correspond roughly to the transport layer of the OSI model, and IP to the network layer. IP is responsible for routing packets from source to destination, and is connectionless, while TCP is connection oriented.

Another protocol that should be understood is the Internet control message protocol (ICMP). ICMP works with IP and is also associated with the network layer. Since IP is connectionless, it has no way to relay messages or errors to the originating post. ICMP performs such functions for IP. ICMP sends status messages and error messages to the sending station. ICMP messages are carried using IP. Yet another protocol that is important in IP networks is the address resolution protocol (ARP). Unlike IP and ICMP, ARP is located at the link layer. ARP maps IP addresses to the hardware addresses of network interfaces. More particularly, ARP is used to dynamically advertise and query about associations of IP/Hardware addresses on a local link. Since TCP/IP works at layer three and above, it needs a mechanism to interface with boards, which are lower level entities. The unique layer-3 addresses of a network interface (i.e., IP addresses) does not identify a physical network interfaces card by themselves. A mechanism is required to correlate the IP address and the data link (i.e., hardware) address. ARP does this. ARP is discussed in more detail below.

TCP and UDP have already been mentioned. The addressable endpoints of TCP and UDP may be referred to as ports. TCP and UDP have applications that are assigned to well-known ports, as well as applications that use dynamically assigned ports. The ports are the endpoints, an addressable entity to create a logical connection. They may be referred to as service contract ports because they may provide services to requesters of a particular service. Port numbers are typically not changed. A communication endpoint address is the combination of an IP address and the port number appended to the end of the IP address.

Each station participating in an IP network is identified with a 32-bit IP address. IP addresses have a fixed length of 32 bits. An address begins with a network number, followed by a local host address. Different classes of Internet addresses are defined. The different classes of IP addresses are provided to take into account the different possible sizes of IP networks. The Internet (i.e., the worldwide network) has different addressing considerations than an internal Internet (i.e., an internal corporate network).

FIG. 7 shows an IP packet header. IP packets are well-known, but a few of the fields will now be briefly discussed. The source address field shows the originator of the packet, and is 32 bits in length. The destination address is the target for the packet. Like the source address, it also is 32 bits in length. The field indicated by "ttl" is the time-to-live field. This field indicates the maximum time a packet is permitted to stay in the Internet system. When the value equals zero, the packet is destroyed or discarded. Time is measured in units per second, and each entity that processes the packet must decrease the value by one, even if the process time is less than one second. The protocol field determines the higher level protocol entity that should process the data contained in the IP packet's workload at the receiver's side. Examples for such higher level protocols are TCP and UDP. The checksum field is a field computed so as to provide a checksum for the header only.

Now a description will be given of the domain name service (DNS). The purpose of the DNS is to translate human readable names for computers, e.g. castor.nec.com, into the corresponding IP-address, e.g. 140.20.20.4, that can be used by the IP protocol.

The DNS is a hierarchical structure in the shape of a tree. At the top of the tree is the root server, which contains information about itself and the top-level domains immediately beneath it. Common top-level domains include .gov, .edu, .com, and .org.

Under DNS, a domain name is a sequence of names with the top-level domain at the end. Each part of a domain name is a label. For example, dept.company.com has three labels: dept, company, and corn. A name server is a program operating on a host, station, or node that translates names to IP-addresses. It does this by mapping domain names to IP addresses. A name server may or may not be a dedicated processor that runs name-server software. A name resolver is software that functions as a client regarding its interaction with a name server. A name cache is a storage used by the name resolver to store frequently used name information.

The domain system assumes that all data originates in master files scattered through the hosts that use the domain system. These master files are updated by local system administrators. Master files are text files that are read by a local name server, and hence become available through the name servers to users of the DNS. The user programs access name servers through resolvers. In general, a user program accesses the DNS through a local resolver. From the resolver's point of view, the DNS includes an unknown number of name servers. Each name server has one or more pieces of the whole domain tree. The resolver sees each of these DNS servers and their associated databases as being essentially static. From the point of view of the name server, the DNS consists of separate sets of local information called zones. The name server has local copies of some of the zones as well as references to other DNS servers, which are responsible for other zones. If a DNS server can not resolve a given name from his locally held database, it forwards the query to a DNS server that is responsible for the zone to which the name belongs.

Regular Station—Regular Network

Next, consideration will be given with respect to what happens when a regular station such as station 210 is attached to its own, regular network, i.e. the first network 200. First, the station 210 must find out the hardware addresses of its next-hop router or gateway and of the other machines that belong to its home network segment. To do this, the station 210 sends out ARP requests.

An example of the operation under this regular arrangement will now be given with respect to FIG. 17. For simplicity, it is assumed that the source station, or sending station, is station 210 connected to network 200 as shown in FIG. 5, and that station 210 has only one network adapter 140 as shown in FIG. 1 (e.g. one Ethernet card).

The station 210 is configured manually with its own IP address (e.g. 138.15.103.21), a netmask (e.g. 255.255.255.0) and a Gateway IP address (e.g. 138.15.103.52) pertaining to router 502. These settings are very specific to the networking environment in which the machine is to be used. The addresses are assigned by the local systems-adrnin, and are put into the stations 210–240. They usually remain unchanged while the station is connected to its regular network.

It may be assumed that station 210 has to send a packet to station 220, which has address 138.15.103.22.

Station 210 first determines whether it is directly connected to the same segment as the destination station. The station 210 compares its own IP-address with the receiver's IP-address, taking into consideration the netmask (step 1710).

The sending station 210 interprets the IP-addresses and the netmask as 32-bit values and compares only those bits of the two IP-addresses, for which the corresponding bit of the netmask is 1 (in this example this means that it compares the first 24 bits of the IP-addresses and ignores the last 8 bits). In both cases, the first 24 bits are 138.15.103.

In step 1720, the masked addresses are judged to be equal or unequal. If equal, processing continues with step 1725; if unequal, processing continues with step 1730. Since the comparison results in a judgment that the masked addresses are equal, processing continues in this example with step 1725.

Given the judgment at step 1720, it may be inferred that the source station 210 and the destination station 220 are connected to the same segment. The next-hop for this particular packet is thus the station having the IP address of the destination station 220.

To deliver the IP-packet to the next-hop (which is the destination station 220 in this example), the IP-host has to determine the hardware address (HW address) of the next-hop. This must be done to instruct the physical transmission media correctly as to where it should deliver the packet. The IP-host knows the next-hop's IP address (i.e., the IP-address of station 220), but it does not yet know the next-hop's HW-address. For this reason it sends out an ARP message in broadcast form to every station on the network 200, asking for the HW-address of the next-hop machine (see step 1720). The ARP message identifies as the intended receiver the destination station 220.

Since the next-hop is a station participating the local network 200, it will receive this ARP request and eventually respond with its own HW-address, thereby providing the HW address of the next-hop station to the sending station 210. At step 1740, the station 210 checks to see whether an ARP reply has been received. If not, a wait period is entered (step 1750). After the wait, it may be determined whether a timeout period has passed in step 1760. If the timeout has not passed, processing may continue with a further check for an ARP reply in step 1740. If the timeout has passed, it may be determined that an error has occurred.

Assuming that an ARP reply is detected, processing continues with step 1770. The ARP reply is examined and the HW address of the next-hop station is determined.

In step 1780, the packet is sent to the next-hop (in this example, station 220), and the packet bears the destination IP address of 138.15.103.22. Station 220 receives the packet because it has a HW address that matches the HW address to which the packet is sent. Station 220 sees that the packet bears, as the destination address, the IP address of station 220. Station 220 therefore keeps the packet.

Now, an example will be provided for the case in which station 210 sends an IP packet to station 310, a station on another network. Station 310 may have an IP address of, e.g., 141.20.20.31.

Station 210 first determines whether it is directly connected to the same segment as the destination station 310. The station 210 compares its own IP-address with the receiver's IP-address, taking into consideration the netmask (step 1710).

The two addresses, when masked, are 138.15.103 for station 210 and 141.20.20 for station 310. In step 1720, the masked addresses are judged to be unequal and so processing continues with step 1730.

Given the judgment at step 1720, it may be inferred that the source station 210 and the destination station 310 are not connected to the same segment. The next-hop for this particular packet is thus the router (gateway) 502. The IP address of the router 502 is 138.15.103.52, as already mentioned. The destination of the packet is still station 310, but the next hop for the packet must be router 502.

To deliver the IP-packet to the next-hop (which is the router 502 in this example), the IP-host has to determine the HW address of the next-hop. The IP-host knows the next-hop's IP address (i.e., the IP-address of router 502), but it does not yet know the next-hop's HW-address. For this reason it sends out an ARP message in broadcast form to every station on the network 200, asking for the HW-address of the next-hop machine (see step 1730). The ARP message identifies as the intended receiver the router 502.

Since the next-hop is a router participating the local network 200, it will receive this ARP request and eventually respond with its own HW-address, thereby providing the HW address of the next-hop station to the sending station 210. The wait and timeout processing may occur for steps 1740, 1750, and 1760 as already described above.

Assuming that an ARP reply is detected, processing continues with step 1770. The ARP reply is examined and the HW address of the next-hop station (in this example, the HW address of router 502) is determined.

In step 1780, the packet is sent to the next-hop (in this example, router 502), and the packet bears the destination IP address of 141.20.20.31. Router 502 receives the packet because it has a HW address that matches the HW address to which the packet is sent.

The router notes that its own IP address does not match that of the destination IP address of the packet. Therefore, the router 502 will undertake the procedure shown in FIG. 17 to forward the packet towards the next-hop along the path to the final receiver.

Thus, when station 210 sends a packet to station 310, the packet is taken by the router 502, passed through the internet 500, taken by router 503, and transmitted to station 310. The packet would show the source IP address as being the address for 210. When replying, station 310 sends out IP packets with the destination being the same as the IP address that was indicated as being the source. The reply packet is taken by router 503, passed through internet 500, and taken by router 502, which knows that the IP address corresponding to station 210 is a regular participant on its own network. Router 502 transmits the packet on network 200 and it is received by station 210.

Guest Station—Foreign Network

In terms of hardware, the term "guest machine" or "guest station" means any of a variety of computing apparatuses or computers that are capable of communicating using the well known internet protocol (IP). A guest machine could be a desktop computer, a transportable or portable computer, a laptop or notebook computer, a palmtop or handheld computer, a personal digital assistant, or the like. An apparatus, to be a potential guest machine, need merely to be capable of communicating using IP.

"Guest station" also implies a station that is not connected to its regular network. This situation might obtain from a variety of reasons, as will now be discussed.

More often than ever, nomadic business travelers and workshop/conference attendees carry a selection of their portable IP-talking gadgets, at least a laptop, when visiting other sites. Being addicted to the blessings of online stock quotes, Email and other Internet services, they usually require access to the Internet from their hosting organization. Often, in those cases, one of the hosting organization's analog telephone lines, together with a 28.8 Kbit/sec modem provided by the guest, is used to dial either directly into the guest's home network or into a public ISP. This solution is not only expensive (long-distance telephone charges) and slow (28.8 Kbit/sec), but often also impractical (no access to analog telephone lines or permission to use them).

It may therefore be desirable for the hosting organization to provide its guests with a more economical and easier to use mechanism for connecting their portable devices to the Internet.

FIG. 8 shows a situation involving a guest station on a foreign network. In FIG. 8, station 210 is a guest station on the third network 400. Station 210 is a regular station of the first network 200. Station 210 is now connected to network 400. Since the third network 400 is not the regular network of station 210, the third network 400 is foreign to the station 210. From the perspective of station 210, therefore, a connection has been made to a foreign network. From the perspective of the third network 400, a guest station has been connected to it. In practical terms, the third network 400 may be thought of as a hotel or a conference center that provides IP connectivity to its guests. This service may be referred to as a service of hosting a guest station, and the network 400 may be thought of as a hosting network.

The Problem with Hosting a Guest Station

The general problem with hosting a guest station will be discussed by way of example, and with respect to FIGS. 8 and 17.

For simplicity, it is assumed that the source station, or sending station, is station 210 connected to third network 400 as shown in FIG. 8 instead of its regular network 200, and that station 210 has only one network adapter 140 as shown in FIG. 1 (e.g. one Ethernet card).

The station 210 is configured manually with its own IP address (e.g. 138.15.103.21), a netmask (e.g. 255.255.255.0) and a Gateway IP address (e.g. 138.15.103.52) pertaining to router 502.

It may be assumed that station 210 has to send a packet to station 220, which has address 138.15.103.22.

Station 210 first determines whether it is directly connected to the same segment as the destination station. The station 210 compares its own IP-address with the receiver's IP-address, taking into consideration the netmask (step 1710). Both masked addresses provide 138.15.103 in the first 24 bits.

Since the comparison results in a judgment that the masked addresses are equal, processing continues in this example with step 1725.

Given the judgment at step 1720, it is incorrectly inferred that the source station 210 and the destination station 220 are connected to the same segment. The next-hop for this particular packet is thus thought to be the station having the IP address of the destination station 220.

To deliver the IP-packet to the next-hop (which is the destination station 220 in this example), the guest station 210 attempts to determine the hardware address (HW address) of the next-hop. Station 210 sends out an ARP message in broadcast form to every station on the network 400, asking for the HW-address of the next-hop machine (see step 1720). The ARP message identifies as the intended receiver the destination station 220.

Since the next-hop is not a station participating the local network 200, and since no station participating in the network 400 has a matching IP address, the ARP request is ignored by every station on network 400 and no station sends an ARP reply.

At step 1740, the station 210 checks to see whether an ARP reply has been received. No reply is ever received, so eventually it is determined that an error situation exists. The packet for station 220 cannot be sent.

Now, an example will be provided for the case in which guest station 210 connected to the third network 400 attempts to send an IP packet to station 310, a station on another network. Station 310, again, has an IP address of, e.g., 141.20.20.31.

Station 210 first determines whether it is directly connected to the same segment as the destination station 310. The station 210 compares its own IP-address with the receiver's IP-address, taking into consideration the netmask (step 1710).

The two addresses, when masked, are 138.15.103 for station 210 and 141.20.20 for station 310. In step 1720, the masked addresses are judged to be unequal and so processing continues with step 1730.

Given the judgment at step 1720, it is inferred by guest station 210 that it and the destination station 310 are not connected to the same segment. The next-hop for this particular packet is thus the router (gateway) 502, at least according to the internal IP settings programmed into station 210. The IP address of the router 502 is 138.15.103.52, as already mentioned. The destination of the packet is still station 310, but the next hop for the packet is set to be router 502.

To deliver the IP-packet to the next-hop (which is the router 502 in this example), the guest station 210 has to determine the hardware address of the next-hop. The guest station 210 knows the intended next-hop's IP address (i.e., the IP address of router 502), but it does not yet know the next-hop's HW-address. For this reason it sends out an ARP message in broadcast form to every station on the third network 400, asking for the HW-address of the next-hop machine (see step 1730). The ARP message identifies as the intended receiver the router 502.

That router, however, does not participate on network 400, and therefore no ARP reply is ever provided to station 210. As in the immediately preceding example, an error situation is determined to be present and no packet can be sent from the guest station 210 to destination station 310.

Even if router 504 could be programmed to send out packets for a guest station 210, a problem would still remain, as will now be explained.

Assume that station 210 is a guest on the third network 400, and sends a packet through router 504 to station 310. The packet is received by router 504 on network 400, which may have an arrangement as the router 600 shown in FIG. 6. Router 504 receives the packet through one of its network adapters 140. The router 504 checks the destination address against its routing tables and recognizes that the packet bears a destination address that does not relate to any of the IP addresses in its own network 400. Router 504 transmits the packet on its other network interface 140. At this point, the packet bears the source IP address of station 210 and the destination IP address of station 310.

The packet is carried across the internet 500 and is provided to router 503 because it is the router that receives all packets for stations expected to be in network 300. Router 503 receives the packet and judges from its routing tables that the IP address for station 310 is an IP address on network 300. Router 503 transmits the packet on network 300 and station 310 receives it.

The heart of the problem comes into focus when station 310 sends a reply packet. The packet received by station 310 bore the source IP address of station 210. Therefore, station 310 transmits a reply packet with the same IP address for the destination of the reply packet. The reply packet bearing as its destination IP address the address of station 210 is picked up by router 503 and passed on to internet 500.

The packet is carried across the internet 500 and is provided to router 502 because that is the router that receives all packets for stations expected to be in network 200. Router 502 receives the packet and judges from its routing tables that the IP address for station 210 is an IP address on network 200. Router 502 transmits the packet on network 200, but station 210 is not connected to the network. The reply packet from station 310 to station 210 therefore never reaches station 210 because station 210 is connected as a guest on foreign network 400.

Discussion of Possible Solutions to the Problem of Hosting a Guest Station

A solution to the problem of hosting a guest station should not require any changes in the guest's device. There are four reasons for this. First, making those changes requires knowledge about local network policies and IP addresses. Second, changing the guest station's device is a cumbersome and error prone task. Third, any changes must be reversed after the visit is over. Fourth, it is never entirely clear what impact such changes have on the guest's equipment. Should a component of the guest's system start to malfunction after such a configuration change, even for a completely unrelated reason, there can be a dispute about possible causes, responsibilities, and liability.

Furthermore, a solution to the problem of hosting a guest station should permit security for the foreign network (also referred to as the hosting network, from its own perspective) to avoid malicious attacks from guests.

DHCP

The use of Dynamic Host Configuration Protocol (DHCP) is one mechanism that may be considered for the support of a guest station on a foreign network. DHCP, however, is disadvantageous in that it does not consider security aspects either for the host network or for the guest station.

Another, potentially insurmountable, disadvantage of DHCP is that it requires support at the guest station. Not all guest stations support DHCP, especially not older systems or simple devices which have only a minimal IP stack.

Yet another disadvantage of DHCP is its requirement for a separate IP address for each guest station. To provide appropriate capacity, a hotel or conference facility would need to obtain a large pool of IP numbers, most of which would typically go unused.

Mobile IP

Mobile IP is another mechanism that may be considered as a solution to the problem of hosting a guest station. Mobile IP, however, depends on the existence of a home agent for each guest. Such home agents are usually not available for most guests.

Most of the foreseeable simple IP devices, e.g. IP pens, portable printers, however, should "just work" in the hosting organization's environment. It is inefficient to place them logically into their home environment, as is the case in the Mobile IP approach with a home agent. It would be better for a guest user to have access to most of the Internet services (i.e., browsing the WWW, sending email, ftp, telnet to read email, and the like) without detour through the regular network of the guest station.

Network Address Translation

Network address translation (NAT) is described in RFC 1631. A version of NAT is available in a commercial product available from CISCO Systems.

In its simplest configuration, the Network Address Translator (NAT) operates on a router connecting two networks together; one of these networks (designated as inside) is addressed with either private or obsolete addresses that need to be converted into legal addresses before packets are forwarded onto the other network (designated as outside). The translation operates in conjunction with routing, so that NAT can simply be enabled on a customer-side Internet access router when translation is desired.

Use of a NAT device provides RFC 1631-style network address translation (see URL http://info.internet.isi.edu:80/in-notes/rfc/files/rfc1631.txt) on the router platform. The goal of NAT is to provide functionality as if the private network had globally unique addresses and the NAT device was not present. Under the commercial product, NAT can perform translation of both source and destination IP addresses in a packet. The translation is performed by using an address translation table maintained in a NAT enabled router.

NAT does not, however, handle guest stations. The translations under NAT require the addresses to be entered into an address translation table. Where a packet is received by such a router, and the source address is not in the address translation table, no translation can take place. Thus, the use of NAT requires support from the hosting organization in the adding of the guest station to the address translation table.

SUMMARY OF THE INVENTION

It is therefore an object of the invention to solve the problem of hosting a guest station in a manner in which the guest simply plugs the guest station into the foreign network and gains instant IP connectivity. Another object is to achieve this even when the foreign network uses a broadcast LAN such as an Ethernet. Yet another object of the invention is to achieve the foregoing without change to the previously set network configuration of the portable device, including IP address, netmask, next-hop-routers (gateways) as well as settings for the Domain Name Service (DNS). It is a further object of the invention to achieve instant IP connectivity in a manner which prevents malicious attacks to the hosting network by the guest station. An additional object of the invention is to achieve the foregoing connectivity in a manner which permits the guest station, if desired, to provide for security against malicious intrusion or attacks from the foreign network. Furthermore, it is also an object of the invention to provide for IP access for a guest station without the need for a large pool of IP addresses. Finally, it is an important object of the invention to provide for IP access for a guest station without support from the guest station and without expecting support from the guest's regular network.

The invention is realized, in one embodiment, in an intelligent router, also referred to herein as an access router, that intercepts all packets sent from the guest and replaces the guest's IP address with a care-of IP address that belongs to the hosting organization.

BRIEF DESCRIPTION OF THE DRAWING FIGURES

The invention will be better understood from the detailed description below, in consideration of the non-limiting, explanatory drawing figures which are now briefly described.

FIG. 3 shows two networks not in communication with each other.

FIG. 4 shows three networks, in a more conceptual view, not in communication with each other.

FIG. 7 shows a header for an IP packet.

FIGS. 12, 13, 14, 15 and 16 show some specific commands and entries related to a specific implementation of one embodiment of the invention.

DETAILED DESCRIPTION OF THE PREFERRED EMBODIMENTS

Useful Reference Articles

Figure 1:
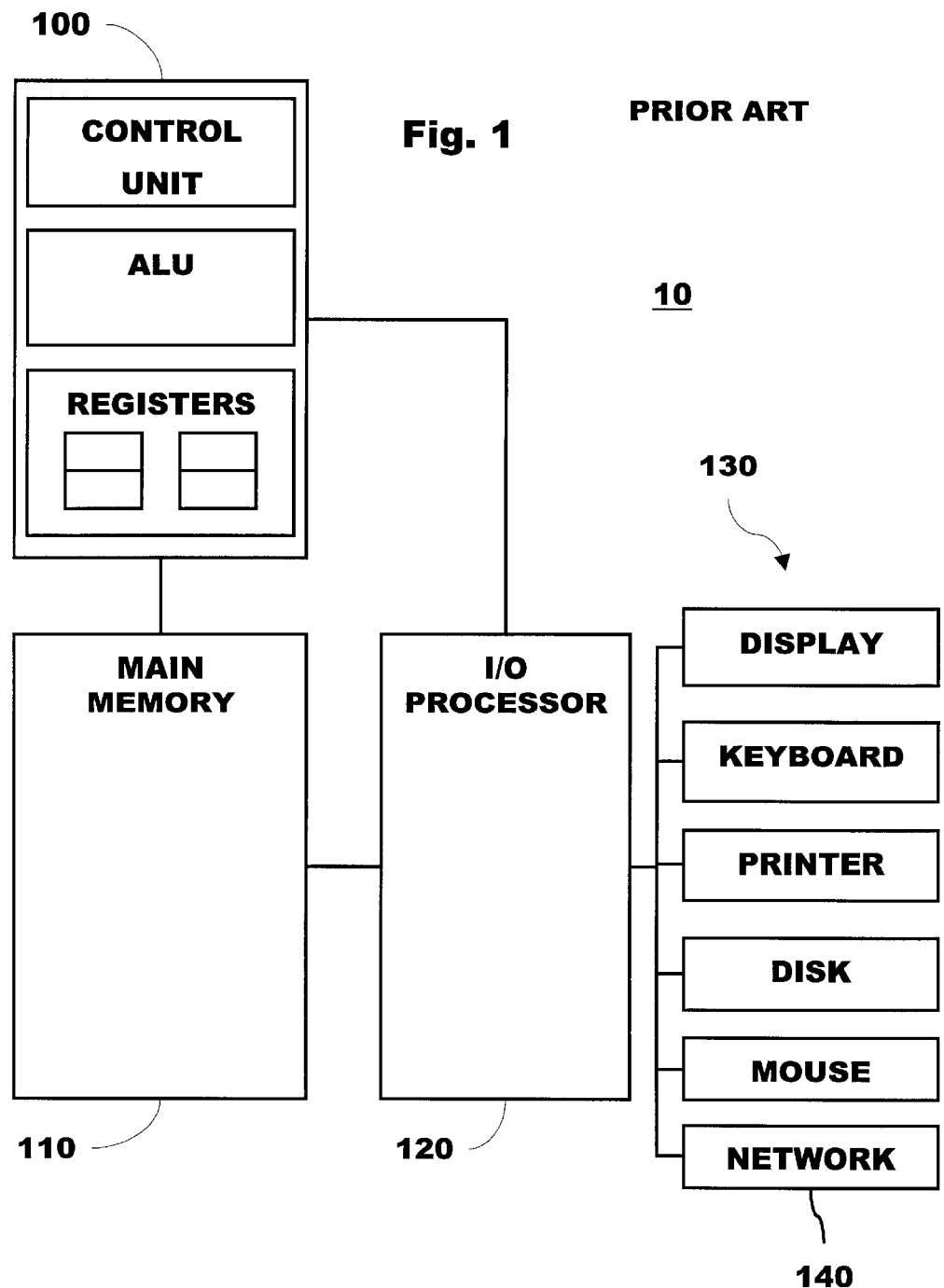
FIG. 1 shows an example of a computer and some of its modules.
Figure 2:
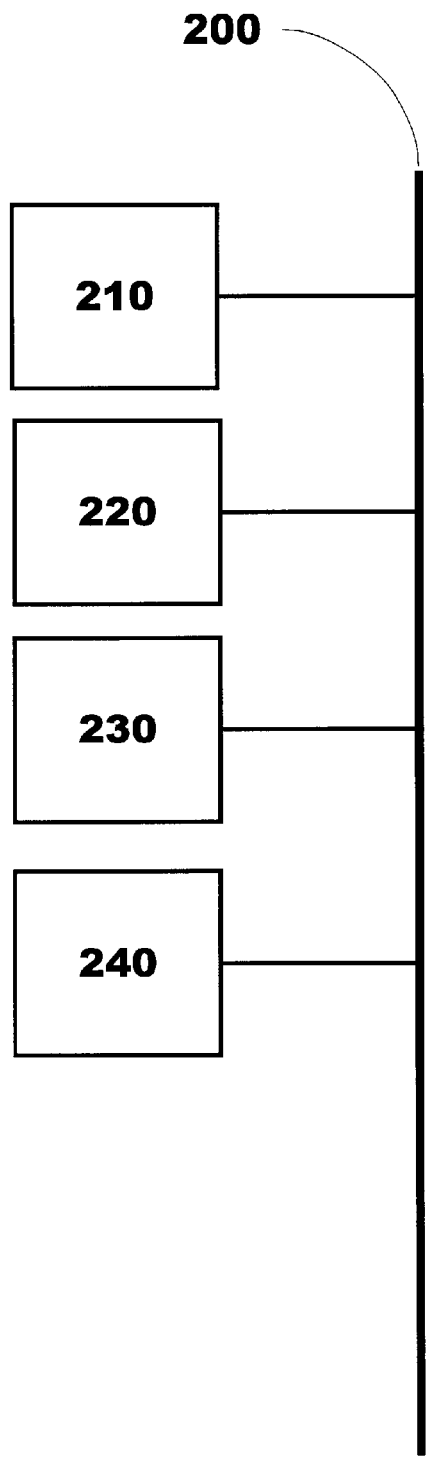
FIG. 2 shows stations on a network.
Figure 5:
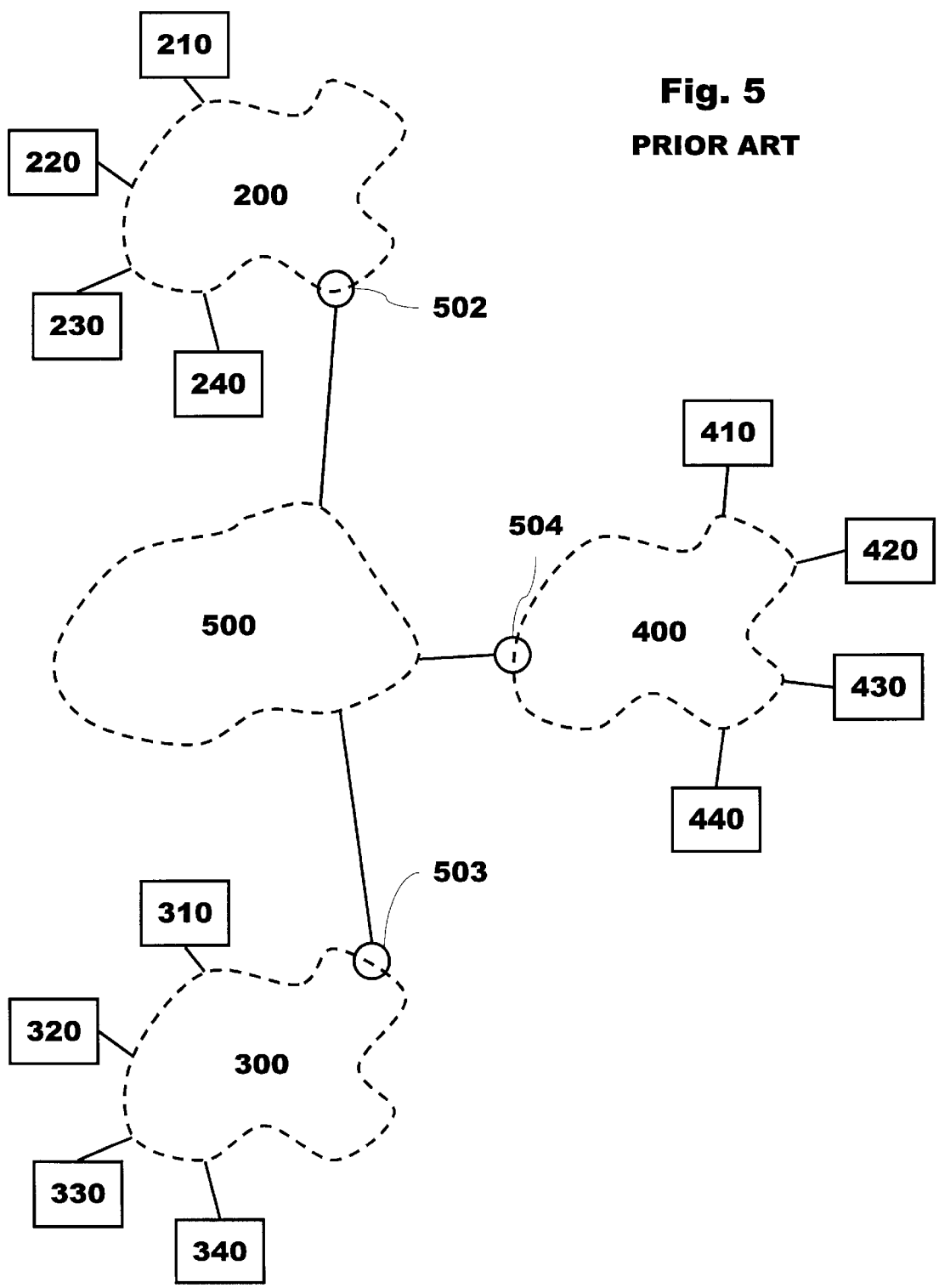
FIG. 5 shows the three networks of FIG. 4 interconnected by a network.
Figure 6:
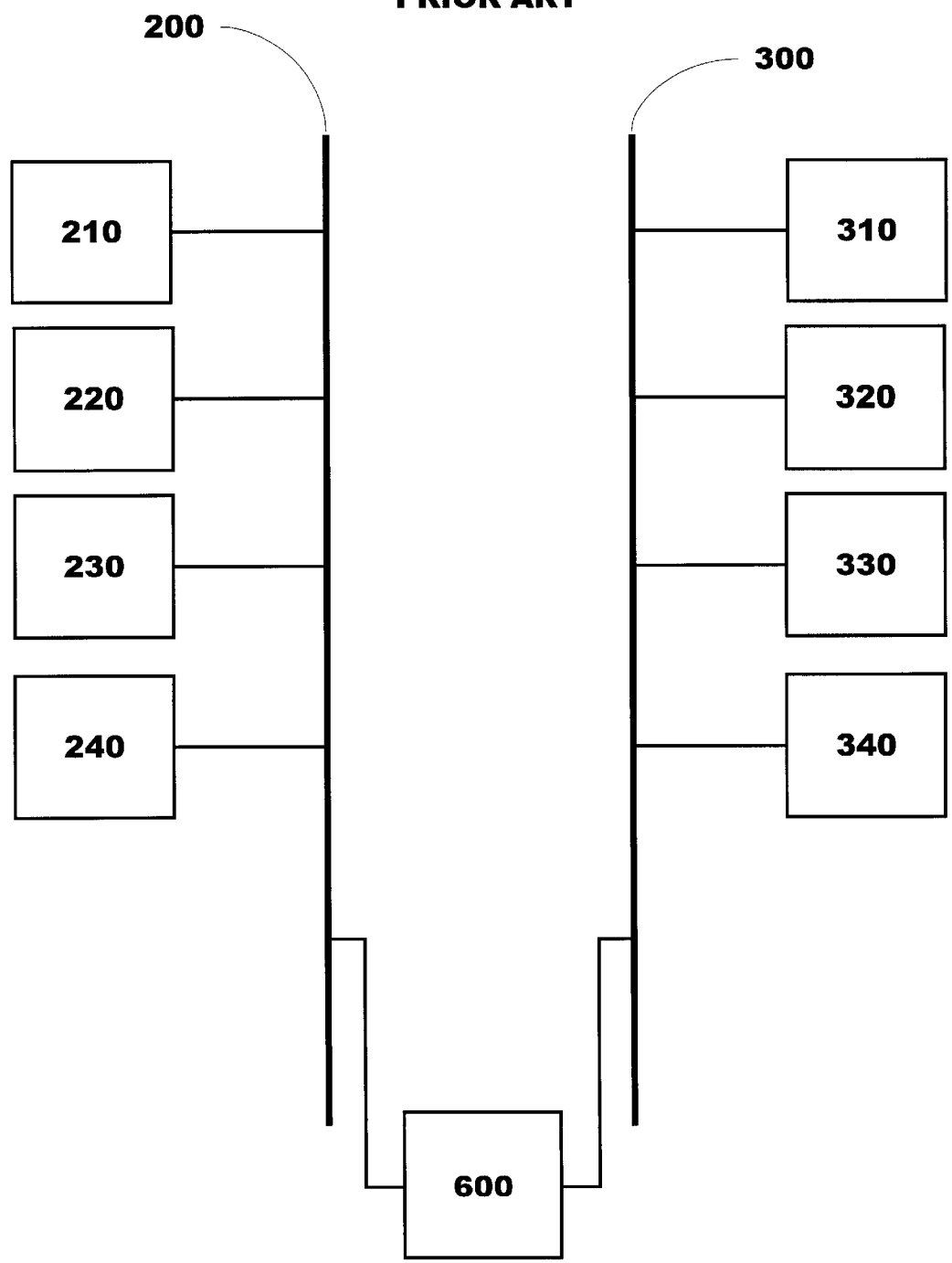
FIG. 6 shows how a router may connect two networks.

The following articles are useful for understanding background information on the topics discussed herein, and all are hereby incorporated by reference in their entirety for that purpose.

(1) ISO, "Open Systems Interconnection (OSI) Reference Model", Standard 1S7498.

(2) R. Droms, "Dynamic Host Configuration Protocol," RFC 2131, IETF, 1997.

(3) D. Plummer, "An Ethernet Address Resolution Protocol-or-Converting Network Addresses to 48-bit Ethernet Address for Transmission on Ethernet Hardware", RFC 826, IETF, November 1982.

(4) "Linux IP Masquerade mini HOWTO", http://www.dlomas.com/masquera.html, March 1999.

(5) Object Management Group (OMG), 'The Common Object Request Broker Architecture (CORBA), Version 3.0, www.omg.org, April 1999.

(6) W. Simpson, 'The Point-to-Point Protocol (PPP)", RFC 1661, IETF, July 1994.

(7) K. Hamzeh and others, "Point-to-Point Tunneling Protocol, Internet Draft, IETF, July 1997.

(8) G. S. Pall and G. Zorn, "Microsoft Point-to-Point Encryption (MPPE) Protocol", Internet Draft, IETF, March 1998.

(9) "Internet Demon inetd—internet super-server", Linux User Manual, Section 8, 1997.

(10) B. Schneier and Mudge, "Cryptanalysis of Microsoft's Point-to-Point Tunneling Protocol (PPTP) ", Proceedings of the 5th ACM Conference on Communications and Computer Security, ACM Press, November 1998.

(11) C. Perkins, "IP mobility support", RFC 2002, IETE, October 1996.

(12) Sun Microsystems, JINI white papers, http://www.sun.com/jini/whitepapers, 1999.

First Embodiment

The invention is realized, in one embodiment, in an intelligent router, also referred to herein as an access router, that intercepts all packets sent from the guest and replaces the guest's IP address with a care-of IP address that belongs to the hosting organization.

It will be appreciated that, herein, a target machine is a station to which the guest station desires to send a packet; the foreign network (as seen by the guest station) may be referred to as the host network interchangeably; a care-of address may be referred to as a c/o address; the home network of the guest station may be referred to interchangeably as the regular network of the guest station; a guest station may be referred to simply as a guest; and the hosting organization may be an organization or person that provides the service of hosting to the guest station, or it may be a third party which is contracted to provide such services.

As mentioned above, an access router intercepts all packets sent from the guest and replaces the guest's IP address with a care-of IP address that belongs to the hosting organization. If the target machine receives such a packet, it will send its response to the c/o address (i.e., to the access router). The access router, when it receives a packet, replaces the c/o address with the guest's IP address and delivers the packet directly to the guest, using link layer addresses. From the guest's point of view, the (intelligent) access router emulates the machines on his home network, in particular its next-hop-router (gateway). From the hosting organization's point of view, the guest becomes a new machine on its internal network (with a dedicated c/o address).

Figure 9:
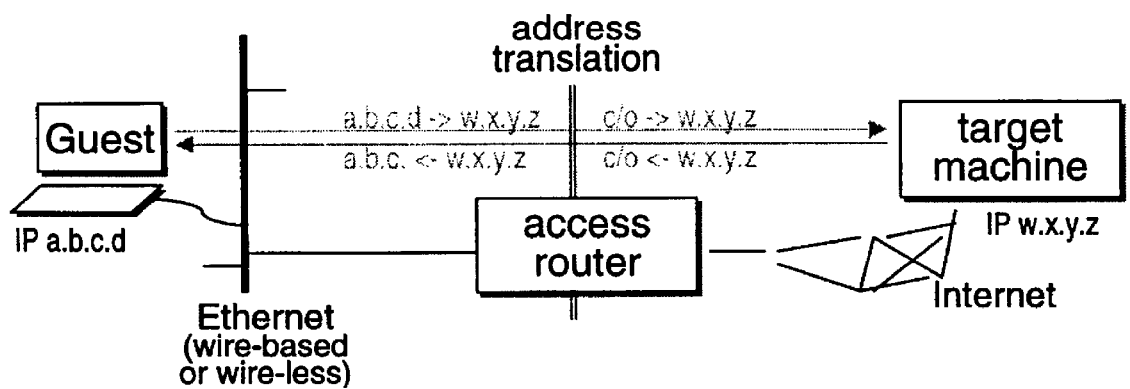
FIG. 9 shows a guest communicating with a target machine through a router according to an embodiment of the invention.

As shown in FIG. 9, when a guest station with IP address a.b.c.d sends a packet with the destination address of a target station having IP address w.x.y.z, the access router replaces the source IP address of a.b.c.d with a local c/o address. The target station's replies are therefore routed to the access router, where the address translation is reversed.

With reference to FIG. 7, it will be understood that the access router replaces the source IP address with the c/o address, decrements the packet's time-to-live (ttl) value, and re-computes the IP checksum.

By virtue of the access router, the guest station can initiate IP traffic, i.e. it can send IP packets to a target station and receive the replies at its current location. Without the replacement of the guest's IP address with the c/o address, all replies would be routed to the guest's home network, where they would typically be discarded.

Outside parties cannot initiate communication with the guest, since they do not know the c/o address until they receive packets from the guest. The access router according to this embodiment of the invention, however, is sufficient for accessing most Internet services, including WWW document retrieval, sending email, telnet (e.g. to read email at home) and ftp.

The software for the access router is simple and easy to install. In contrast to DHCP (2) or Mobile IP (11), it requires no setup-signaling or pre-installed software on the guest's machine or the guest station's regular network. The only requirement is that the guest have a pre-installed IP configuration. It can therefore support any existing IP device, operating system and configuration, without change. Because there is no signaling or initial setup involved, the proposed technology is fast and highly scalable.

Detailed Implementation Issues—First Embodiment

The following discussion concerns some specificities relating to implementing the first embodiment of the invention.

The first step in providing IP access to a guest station using an access router is to enable the guest's portable device to send IP packets to any remote destination, and to ensure that replies from there are routed back to the portable device's current location. This may be achieved in two steps. In a first step, the access router intercepts all IP packets sent from the guest, no matter what the IP-address of their designated next-hop is. Second, before further forwarding the intercepted packet, the same access router replaces the guest's IP address with a local c/o IP address. Similarly, for return-traffic, this c/o address is translated back to the guest's real/home IP address, before the packet is eventually delivered directly to the guest on the physical link.

IP Packet Interception Using Proxy ARP

When the guest station and the access router are connected via a physical point-to-point medium, the IP packet interception is trivial. When the guest station and the router are connected via a shared medium, several considerations arise. Examples of such a shared medium include wire-based or wireless Ethernet.

The Internet's topology, i.e. its connectivity graph, is defined in terms of IP addresses. When forwarding an IP packet, a network node performs a routing table lookup for that packet, which yields the IP address of the node that the packet has to be sent to next. This node may be called the next-hop. Since the packet is eventually transmitted by means of the physical medium between these two nodes, the sender has to translate the next-hop's IP address into a media dependent hardware address. For shared media, this IP-to-hardware address translation is done by the Address Resolution Protocol (ARP) (3).

When a network node must convert an IP address to a hardware address, it broadcasts an ARP message to all machines it is directly connected to. The next-hop (router or final receiver) will be one of these machines. When the next-hop receives an ARP request for its own IP address, it responds with its own hardware address. Using this hardware address, the host that initiated the ARP request can now send the data packet to the next-hop on the physical layer.

It is possible for another machine to answer the ARP request by proxy on behalf of the station with the IP address mentioned in an ARP request. This mechanism is called proxy-ARP and can be used in cases when the target machine does not support ARP.

The exchange of ARP messages happens on the physical layer. For each medium, a mapping between all possible ARP messages and the message formats of that medium therefore needs to be defined.

According to a preferred implementation of the first embodiment of the invention, proxy-ARP is used for intercepting the guest's outbound IP traffic. When the guest station initially is attached to the hosting network, the guest station does not know any hardware addresses of that network. Therefore, assuming that it is still connected to its home network, the guest station sends out ARP requests to learn about the hardware addresses of its next-hop router (gateway) and of the other machines that belong to its home network segment. These are not present in the hosting network, and so the ARP requests remain unanswered. To emulate those "missing" machines, the access router answers (by proxy) ARP requests with its own hardware address. This causes the guest station to send all traffic to the access router, believing the access router to be the next-hop machine that it originally wanted to talk to.

It is important, however, that the access router not respond to ARP requests for machines that are actually present at the local network segment, especially including others of the guests. If the access router responded by proxy for other guests, all IP traffic from the guest station destined for those other guest stations would be physically sent to the access router, making the other guest stations practically unreachable.

Another consideration that must be handled in this embodiment of the invention is the fact that many machines send out an ARP request for their own IP address when they boot. This is done by a newly booted machine to determine whether its IP address is already used by another machine. If the access router would respond to such an ARP request with its own hardware address, the booted machine would think that the access router uses the same IP address as itself, and shut its network interface down. One way of handling this consideration will now be described.

On an Operating System that supports the Berkeley Socket Programming Interface (sockets), as for example Ling or another Unix-system, it is possible that a user level process receives all ARP-requests that are broadcasted on each of the networks it is connected to (implementation hint: use packet-socket with the protocol specified as ETH_P_ARP). By listening to all ARP-messages, this program can learn about the IP-addresses and corresponding HW-addresses of all machines, including guests, that are connected to the local network. If this program, which is executed inside the intelligent router, receives an ARP-request for an IP-address for which it does not yet have an IP/HW-address mapping, it concludes that this ARP-request might come from a new guest. However, the program first waits a certain period (in the current implementation 20 milliseconds). If after that time no ARP-reply has been send by another machine, the program concludes that it actually detected a new guest and responds to the original ARP-request with its own HW-address. This algorithm ensures that (1) new guest's ARP-requests are answered, and (2) that no ARP-replies will be generated in proxy for machines that are actually present.

The interception of packets by a router according to this first embodiment of the invention will now be described with reference to FIGS. 17, 18, 19, and 20.

Figure 19:
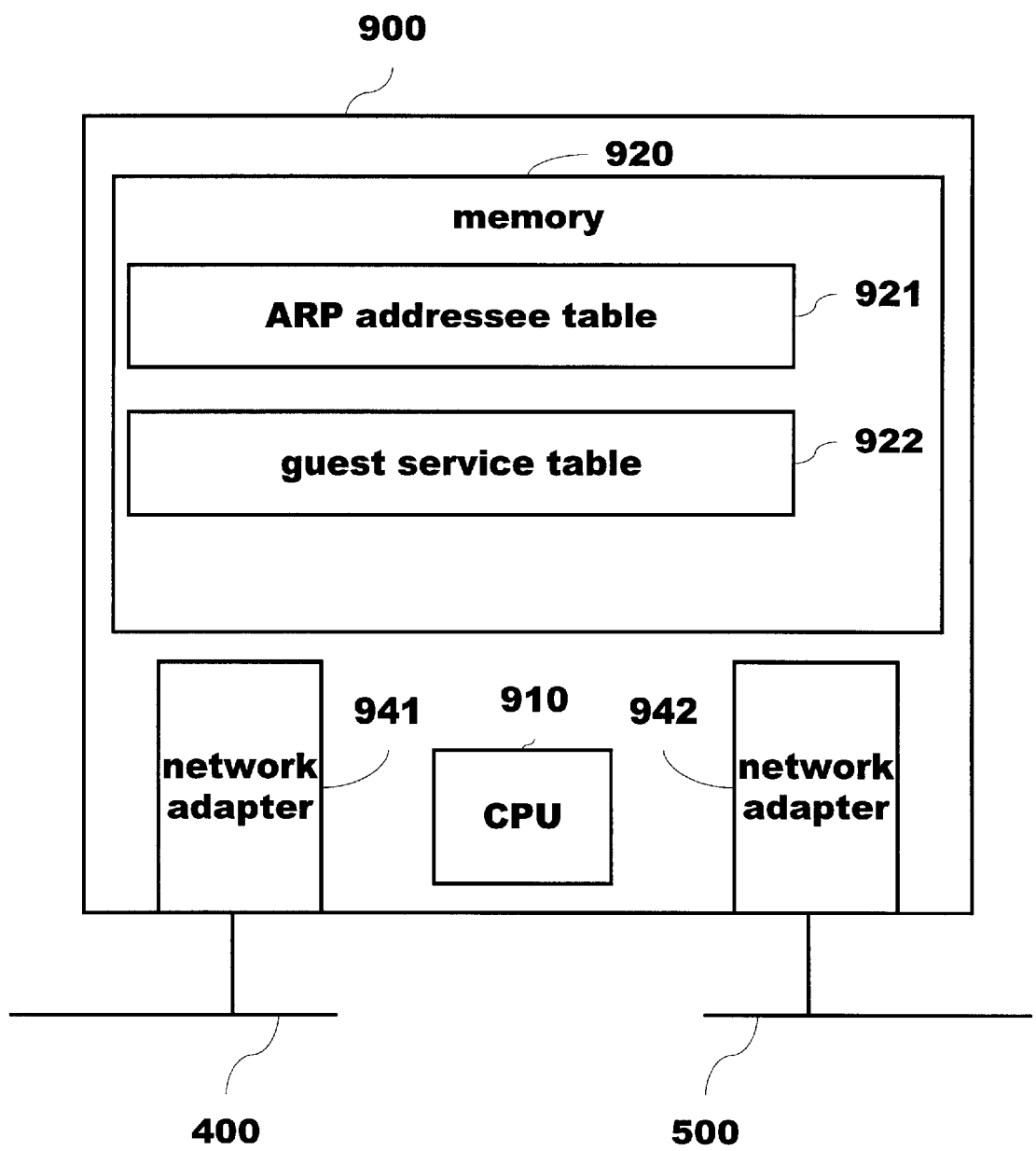
FIG. 19 shows a simplified schematic view of an access router according to an embodiment of the invention.

FIG. 19 shows a router according to this embodiment of the invention. Reference 900 indicates the access router. The access router has a CPU 910, a memory 920, and network adapters 941 and 942. The router may be a general purpose digital computer equipped with software that causes it to operate according to steps as described below.

Figure 8:
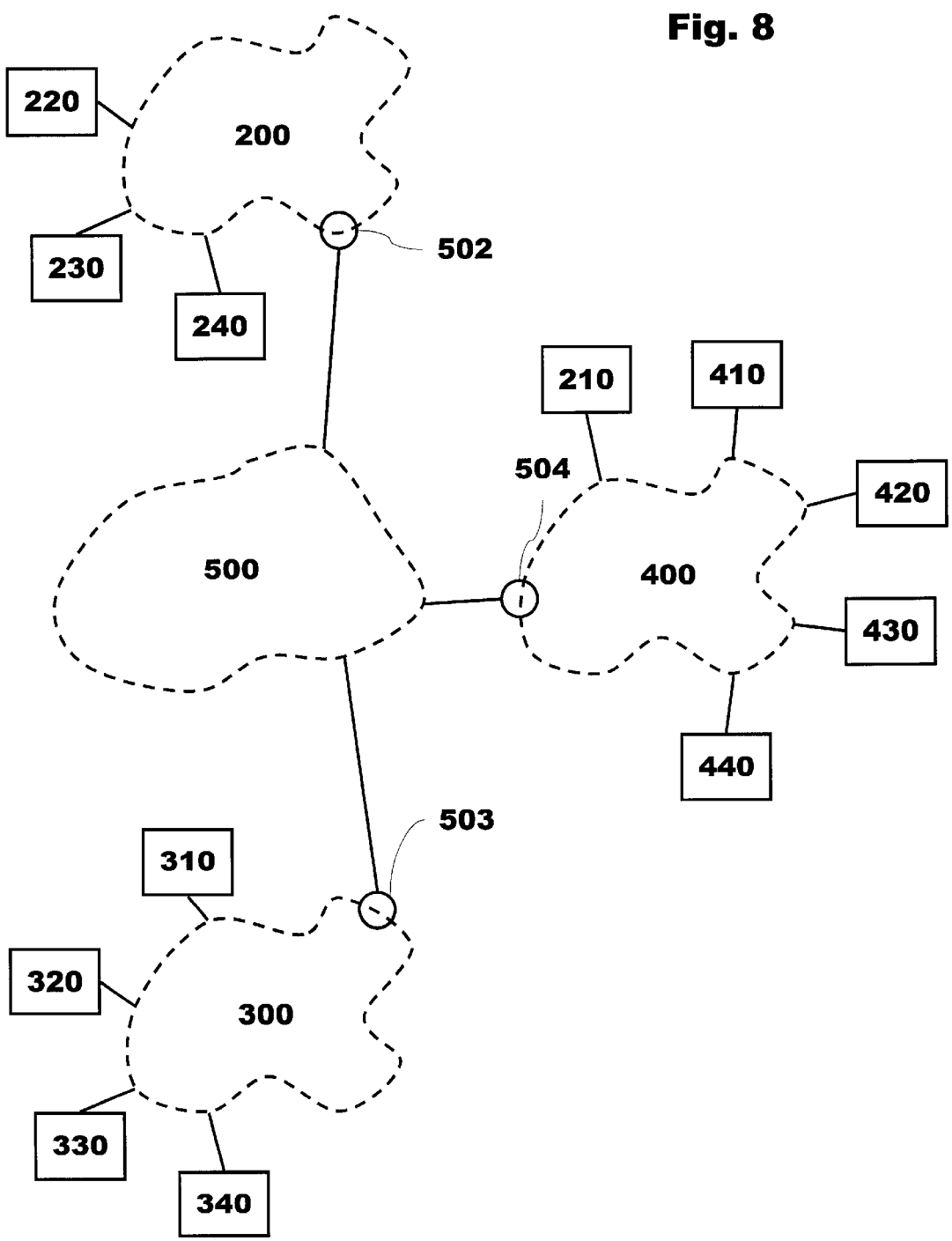
FIG. 8 shows the networks of FIG. 5 in which one station is a guest station of a foreign network.
Figure 18:
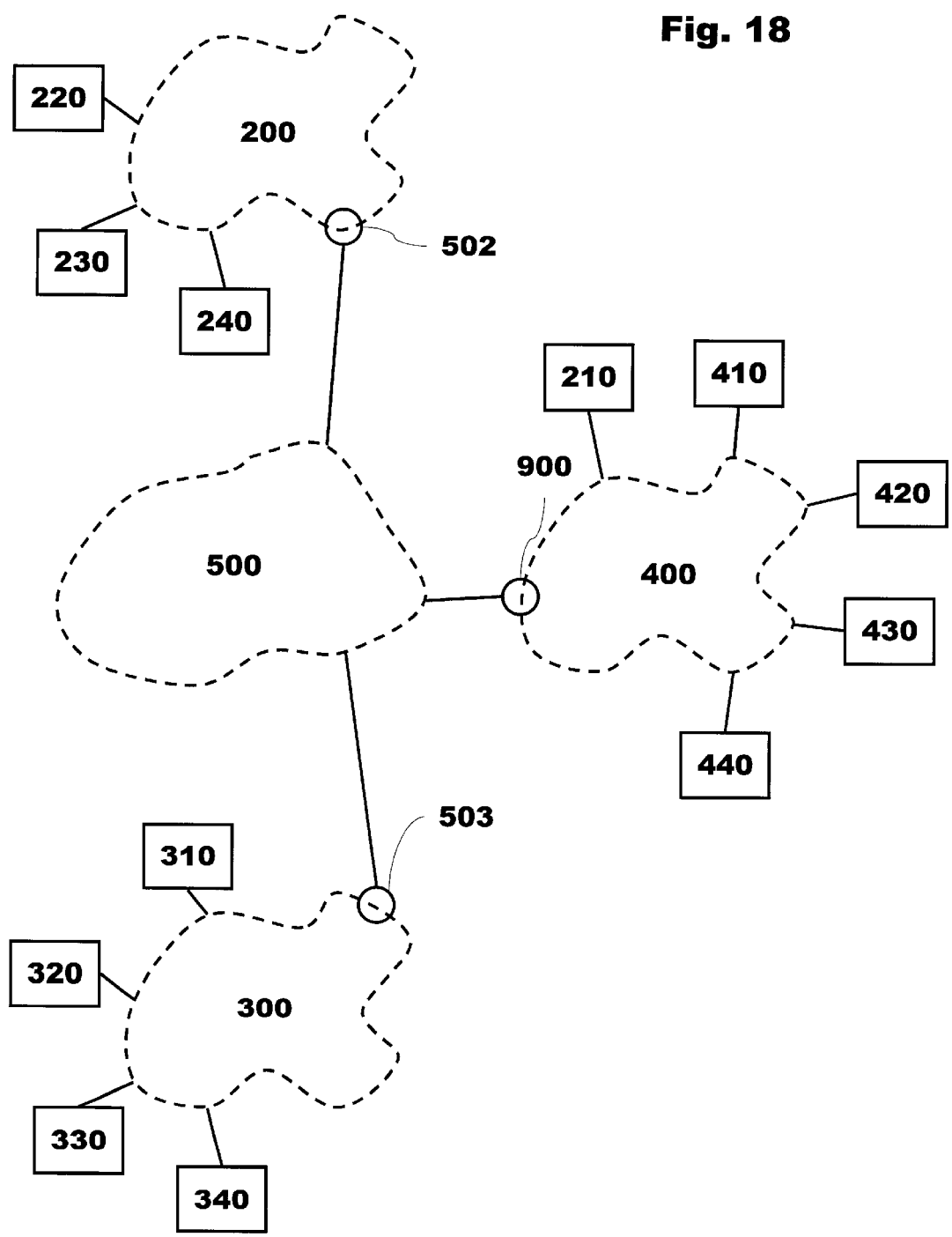
FIG. 18 shows the networks of FIG. 8, in which an access router according to an embodiment of the invention is provided on a hosting network.

FIG. 18 shows a network similar to that described in the sections above and shown in FIG. 8. In FIG. 18, however, the router 504 has been replaced with an access router 900. As shown in FIG. 19, a first network adapter 941 of access router 900 is connected to a local network 400. Similarly, a second network adapter 942 of access router 900 is connected to an outside network, or the Internet, shown by reference 500. The memory 920 of access router 900 includes an ARP table 921 and a guest service table 922.

Station 210 is a guest station with respect to network 400 because it has, as its regular network, the first network 200. In this example, station 210 wishes to send an IP packet to station 310 located at its normal position in the second network 300. Station 310 is the destination station for the IP packet. In this example, the IP address for station 210 in its regular network is 138.15.103.21. The address for station 310 is 141.20.20.31. The address for router 900 may be 216.52.92.54. The router 210 has been preconfigured for operation in its regular network to know that its router is router 502, which has an IP address of 138.15.103.52.

Figure 17:
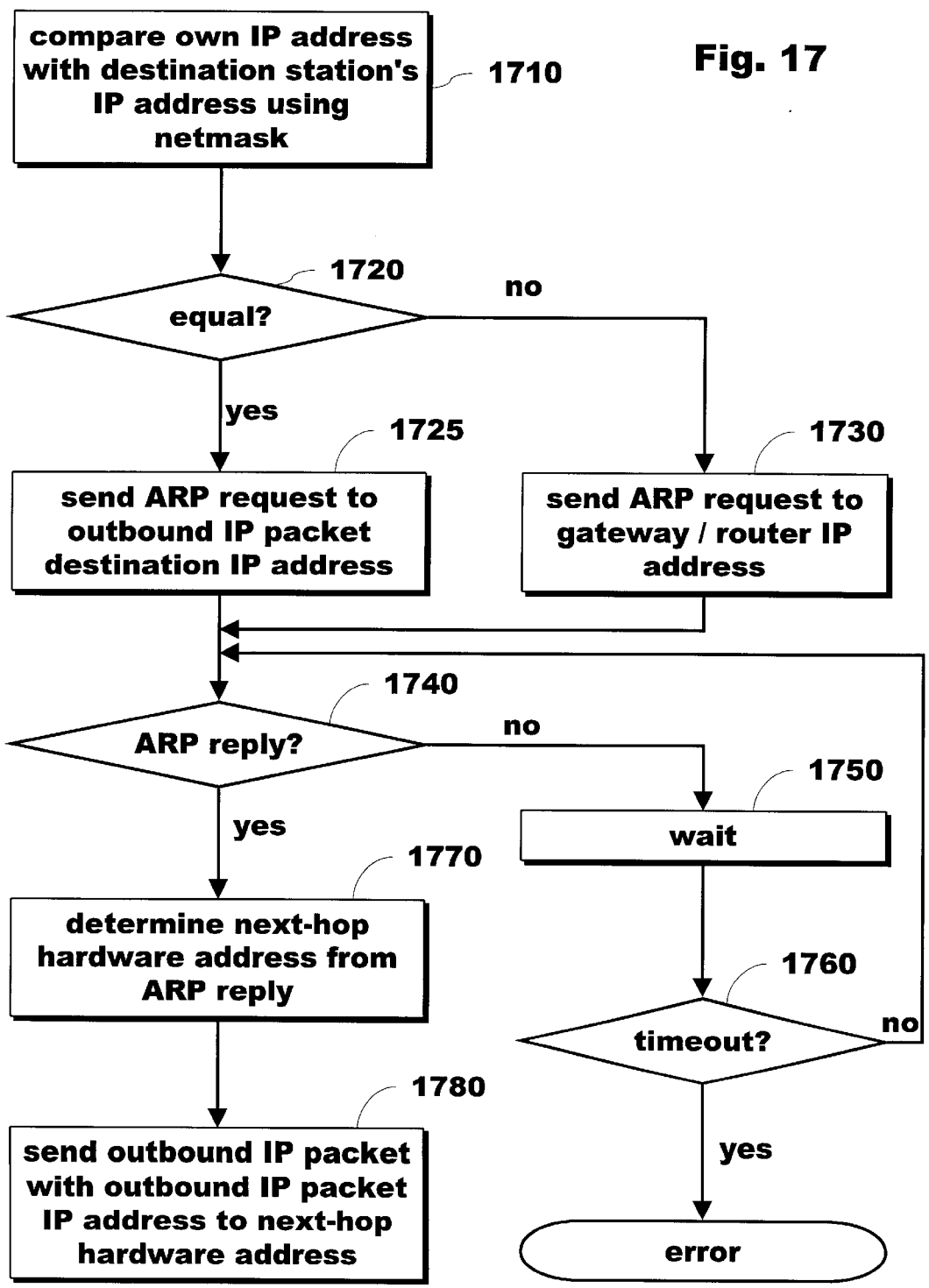
FIG. 17 shows a flowchart relating to a station sending an IP packet.

The operation of guest station 210 is shown in FIG. 17, and is exactly the same from the point of view of the guest station as if it were at its own home address.

First, the guest station 210 compares its own IP address with the outbound IP packet destination address using its own predetermined net mask in step 1710. The comparison in step 1720 indicates that the masked addresses are not equal, and so processing continues with step 1730. The guest station 210 sends out an ARP request to its predetermined router IP address 138.15.103.52.

Figure 20:
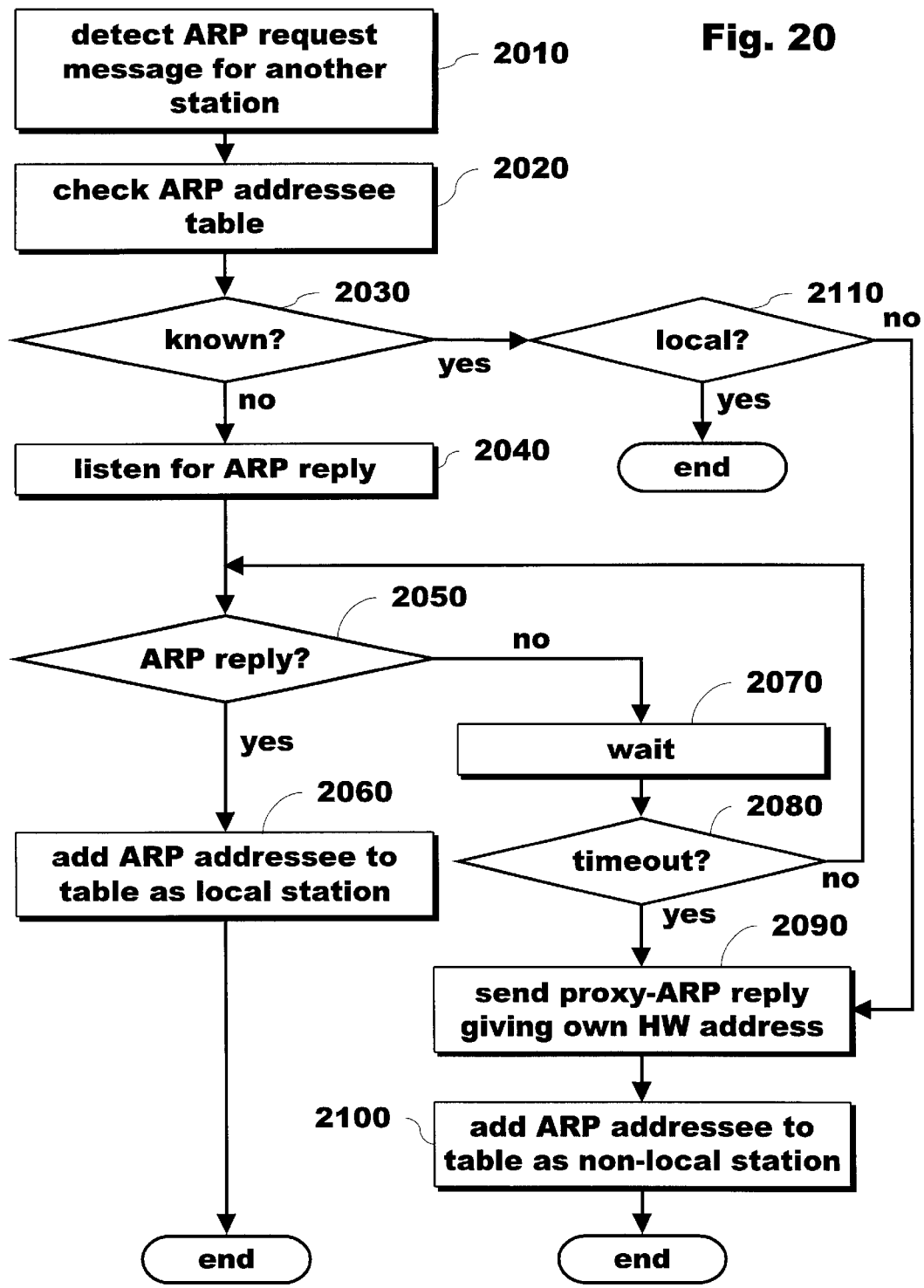
FIG. 20 shows a flowchart relating to the operation of an access router according to an embodiment of the invention.

Under normal circumstances, since there is no station that has the IP address 138.15.103.52 on network 400, the guest station 210 would normally not receive a reply. However, access router 900 is operating on network 400 and, by means of the proxy-ARP program, responds to ARP requests as shown in FIG. 20.

In step 2010, the access router 900 detects the ARP request sent by guest station 210. The access router's proxy-ARP program checks its ARP table 921 in step 2020 to determine whether the ARP addressee is already known to the access router. If the IP address of the addressee of the ARP request is already recorded in the ARP addressee table 921, then processing continues with step 2110. If the IP address of the addressee of the ARP request is not already recorded in the ARP addressee table 921, then processing continues with step 2040. In the present example, since guest station 210 may just have been connected to network 400, it is unlikely that the ARP addressee table has any entry for the station to which the ARP request from guest station 210 is addressed (i.e., no entry for router 502).

Therefore, processing continues with step 2040. In step 2040, the access router listens for an ARP reply to be sent to guest station 210 from any other station on network 400. If the access router detects an ARP reply from another station on network 400 then processing continues with step 2060. Otherwise, processing continues with step 2070.

In the event that another station on the network 400 replies to the ARP request from guest station 210, then this means that the ARP addressee is participating in the local network 400. This situation implies that no additional intervention is required by the access router 900 in order for communications to occur between the guest station 210 and its ARP addressee. In the present example, however, the desired ARP addressee (router 502) is not participating in network 400, so processing continues to step 2070.

At step 2070, the access router 900 enters a wait state. After the wait state expires, processing continues with step 2080. At step 2080, it is determined whether a predefined router ARP wait threshold has expired. In the preferred embodiment, the router ARP wait threshold is 30 microseconds. It is sufficient, however, to use any time threshold that is at least twice the maximum delay for the request-reply period for the ARP protocol.

In step 2080, if the router ARP wait threshold has not yet been exceeded, processing continues with step 2050 to see whether or not an ARP reply has been received. In this example, no other station on network 400 sends an ARP reply to the ARP request message from guest station 210. Therefore, the router ARP wait threshold is met or exceeded, and processing continues with step 2090.

In step 2090, the access router 900 sends a proxy-ARP reply back to station 210 in which the proxy-ARP reply indicates the HW address of the access router 900. At step 2100, the access router adds the IP address 138.15.103.52 (i.e., the IP address for router 502) to the ARP addressee table 921 as a non-local station. Processing at step 2110 will be described later on, below.

Returning to FIG. 17, the guest station 210 had previously sent out an ARP request to its predefined router IP address for router 502 (i.e., IP address 138.15.103.52). In step 1740, guest station 210 detects an ARP reply and so processing continues to step 1770. The ARP reply, however, is actually a proxy-ARP reply sent from access router 900. This proxy-ARP reply will make the guest station 210 think that the HW address for router 900 is the HW address of the next-hop machine of its home network, in this example router 502. In step 1770, the reply received by guest station 210 is analyzed to obtain the next-hop HW address. The next-hop HW address is the HW address for the access router 900. In step 1780, the guest station 210 sends the outbound IP packet with the outbound IP packet address of 141.20.20.31 (namely, the IP address of destination station 310) to the next-hop. It does not matter that the guest station 210 thinks that this is the HW address for router 502. The important effect is that the packet is sent to a next-hop even though the packet is sent from a guest station that is foreign to be hosting network 400.

Returning to FIG. 20, the operation at step 2110 will now be explained. In particular, it may occur that guest station 210 sends out another ARP request that has an ARP addressee of station 502. In such a case, the access router 900 detects the ARP request at step 2010. The access router checks its ARP addressee table 921 at step 2020. At step 2030, a determination is made that the address is already known and appears in the table. At step 2110, if the ARP addressee is local to network 400, then access router 900 takes no action because it expects the local station to reply to the ARP request. On the other hand, if the ARP addressee is indicated in the ARP addressee table 921 as being a non-local station, then the access router 900 knows that it must itself reply to the ARP request message by sending a proxy-ARP reply. This reply is sent when processing continues with step 2090.

In the foregoing example, the guest station 210 needed to send a packet to a destination station 310 that was not normally part of its regular network 200. Now, a brief example will be given in which guest station 210 attempts to send an IP packet to a station 220 that normally appears on the same regular network as the station 210.

Briefly, the comparison in step 1720 will result in a judgment that the masked addresses of the guest station 210 and the destination station 220 are equal. Therefore, in step 1725, the guest station 210 will send out an ARP request to the IP address for station 220, in this example 138.15.103.22.

The access router will detect the ARP request message in step 2010. The check of the ARP addressee table in step 2020 will reveal in step 2030 that the ARP addressee (namely, station 220) is unknown to the access router 900. The access router will listen for any station on network 400 to send an ARP reply in step 2040.

It may be the case that station 220 has an owner that is also attending the same hotel or conference as the owner of station 210. In this event, station 220 will immediately send an ARP reply back to station 210 and the access router 900 will add the IP address for station 220 as a local station in the ARP addressee table 921. Thus, stations 210 and 220 will be able to communicate directly without any intervention from access router 900. Assuming, however, that station 220 is connected to its regular network 200, no ARP reply will be provided back to guest station 210.

When the router ARP wait threshold is exceeded in step 2080, the access router 900 will send a proxy-ARP reply to station 210 giving its own HW address. In addition, the IP address for the ARP request addressee will be added to the ARP addressee table 921 as a non-local station.

The guest station 210 will receive the ARP reply at step 1740 and use the HW address of the access router 900 for sending its outbound IP packet to the next-hop. Thus, whether the destination station for the outbound IP packet is a station normally connected to the regular network of the guest station, or is a destination station not normally connected to the regular network of the guest station, the access router 900 causes the guest station 210 to send the outbound IP packet to it. However, this embodiment of the invention takes into account the situation in which there are two guest stations present that normally share the same regular network.

When the access router 900 provides its HW address to a guest station, thereby causing the guest station to send an outbound IP packet to the access router, this may be referred to as the access router intercepting an outbound IP packet.

C/O Address Assignment

Once the access router has intercepted an outbound IP packet, it can learn the guest station's IP address, i.e. the IP address that the guest uses in its home network, from the source IP address field of the IP header (see FIG. 7). Since this home-address is globally unique, it is further used within the access router to identify the guest station. For the special case where the guest has a local/private IP address which does not have to be globally unique, i.e. an IP address of the form 192.168.x.x, the guest's IP-address is used together with the guest's globally unique HW-address to identify the guest.

Furthermore, for every registered guest, the access router may maintain in a guest service table 922 a guest service record with statistics and other per-guest data. The guest service record may be removed, for example, when the guest does not answer to a certain number of consecutive ping requests, which the access router may periodically issue for each guest station that has been inactive for a predetermined amount of time.

As already explained, if the access router would behave like an ordinary gateway router and simply forward the intercepted packets, the receiver would reply to the guest's IP address and all such reply packets would be lost because they would be routed to the guest's home network instead of the hosting network. To avoid this, the access router associates a local c/o address with the guest's home-address, and writes it into the IP header's source-address field. Replies for those packets are routed back to the access router, where they can be prepared for final delivery to the guest. The association between a guest station and its assigned c/o address may be kept in the guest service record. If the access router receives an IP packet for which no guest service record exists, it may automatically recognize a new guest and creates a new guest service record (with a new associated c/o address).

For inbound (i.e. return) traffic, the access router uses the destination address, which should be one of the previously assigned c/o addresses, to locate the corresponding guest service record. The guest's home IP address is now placed into the destination address field of the IP header and the packet is delivered to the guest on the physical layer.

ICMP Echo-Reply Messages

An ICMP echo-reply message is a reply to a previously issued ICMP echo request. As specified in the IETF standard, this reply message carries the original echo request "piggy-back" in its workload. Without special handling, the access router would encapsulate the original message, which contains the c/o address rather than the guest's home address in its IP header, and this would pass the access router unchanged. Some systems, specifically Microsoft Windows systems, are confused when they receive an ICMP echo reply with a wrong IP source address in its encapsulated original echo request message. Programs like tracert (Window's version of UNIX's traceroute) would not work. In this specific case, the access router according to the first embodiment of the invention modifies the IP packet's workload by replacing, in the IP header of the encapsulated packet, the c/o address with the guest's home address.

Checksum Computation

Whenever the source or destination address of an IP packet changes, the IP header checksum needs to be recomputed. Since the access router changes the source IP address for each packet, this recomputation of the header checksum must also be performed at the same time. In addition, for the protocols TCP, UDP, and ICMP, the TCP/UDP/ICMP-header checksum must also be recomputed since the IP header's source and destination addresses are included in the computation of these checksums.

Guest to Guest Communications

The presently preferred embodiment of the invention, as already described above, provides for communications when one guest wants to talk to another guest, and they normally would have been on the same regular network. This special case is actually not as unlikely as it may initially appear. When a visitor brings several IP capable devices into the hosting organization's environment (e.g., a laptop, a portable printer, and other useful gadgets), each is a guest station. Those guest stations probably need to interact with each other. This scenario is similar to SUN MICROSYSTEMS' JINI technology (12), in which portable devices plug and play together to form impromptu communities providing high-level services to their users without any previous planning or human installation.

In the scenario described above, the two guests interacted without any involvement of the access router. Depending on the timing of the connection of these different guest stations or devices to the network 400, it may be the case that one of the guests records the hardware address of the access router for another guest, and the access router is acting as proxy for the other guest, and the access router ends up intercepting such packets. Afterward, another guest that normally shares the same regular network as the first guest connects to the network 400. The access router according to an embodiment of the invention is programmed to recognize when an ARP addressee indicated as being non-local in the ARP addressee table 921 is indicated as being a guest in the guest service table 922. In such a case, the access router 900 may change the status in the ARP addressee table to local and allow the guests thereby to communicate without intervention by the router. Other ways of accomplishing this are also possible, including forwards outbound packets, unchanged, though the same network adapter through which it was received (i.e., adapter 941 in FIG. 19). In either case, the guests can communicate with each other using their home IP addresses.

Second Embodiment

A second embodiment of the invention provides for additional security protection for the hosting network.

It will be remembered that the access router takes each packet sent from the guest and replaces the source IP address (i.e., the address of the guest) with a c/o address that makes the packet appear as if it had originated from an IP address associated with the host network. This appearance may not be desirable from the perspective of the host network, however. In particular, the regular stations of the host network might have certain privileges usually reserved for regular members of the hosting network. In addition, the hosting organization may consider it a security hazard if guests release IP packets inside their network, which is normally protected by a firewall against outsiders.

A malicious guest, however, might be able to send packets (via the access router) to the hosting network with the appearance of being a member of the hosting network. The source IP address in such packets, after having been replaced with the c/o address, cannot be distinguished from packets sent by the regular stations of the hosting network.

According to this second embodiment of the invention, an IP tunnel between the access router and an outside station (such as a router in the public Internet) is used to protect the hosting network and environment against IP packets from malicious guests. When a packet is sent from the guest to a machine inside the hosting organization, it first leaves the hosting organization's network through the IP tunnel, and then must re-enter through the corporate firewall. Here, an "outside station" is a station outside the firewall of the hosting organization. This ensures that IP packets from a guest can never reach a station internal to the hosting network unless they are authorized by (i.e., passed through) the corporate firewall.

This additional protection can be achieved by physically connecting the access router's outbound network interface to a next-hop router outside the corporate firewall, e.g. with a long cable. Even so, the access router would physically still be located at the hosting organization's premises. From the network's point of view, the access router would reside outside the corporate network and within the public Internet domain. When a guest sends an IP packet to one of the hosting organization's internal machines, this packet would have to go through the firewall in the very same way as if it came from the public Internet.

Instead of using a physical wire for connecting the access router to the outside next-hop router, a 'virtual wire' in the form of an IP tunnel may be used to provide the same functionality and degree of protection, but in a much more economical and flexible way.

An IP tunnel is defined through its two tunnel endpoints, which are identified by their IP addresses. A tunnel's purpose is to emulate a physical point-to-point wire, which can be used in place of a physical medium to transmit IP packets between those two points. From a systems engineering point of view, IP tunnel endpoints are often represented as "logical" network interfaces and equivalent to, for instance, the interface of an Ethernet network card. In order for an IP packet to be sent through the IP tunnel, it is encapsulated into another IP packet, which is routed, hop by hop, to the other tunnel endpoint. When it arrives at the endpoint, the encapsulated packet is released.

Since the original packet is confined to the workload of the encapsulating packet, its IP header cannot influence the routing of the encapsulating packet. That is, it is impossible for the encapsulated packet to leave the tunnel.

To emulate the full level of privacy that is usually associated with a physical wire, both tunnel endpoints in an IP tunnel are typically required to authenticate each other and to encrypt the encapsulated packets. In this embodiment of the invention, however, where the IP tunnel is used only to ensure that the guest's traffic cannot be released within the hosting organization's network, authentication/encryption is not a concern for the hosting environment and may be omitted.

Figure 10:
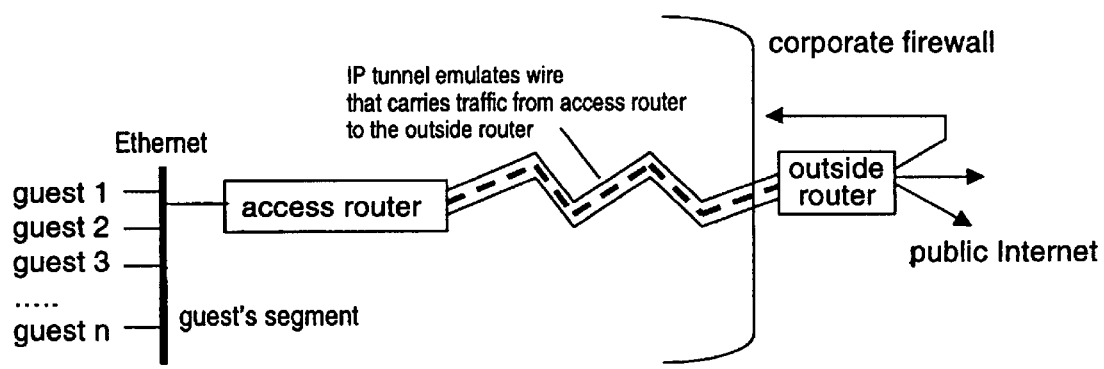
FIG. 10 shows an IP tunnel between an access router and a next-hop router in the public Internet.

FIG. 10 shows an IP tunnel between the access router and a next-hop router in the public Internet. Packets that the guest station sends, and that the access router changes, are all sent through the IP tunnel.

Several technologies are available for creating IP tunnels. All require an explicit tunnel setup. What differs are the encapsulation techniques. One IP tunneling technology with very little overhead (20 bytes more data, no data processing per packet) is IP-over-IP. On a LINUX system, the ifconfig command can be used for setting up such a tunnel.

Optionally, the routing table of the outside router can be adjusted to ensure that traffic addressed to one of the c/o addresses is routed through the tunnel.

Third Embodiment

A third embodiment of the invention provides for additional security for the guest station.

Guests might not trust their hosting environment or may be concerned about attacks from the public Internet. Since their association with a particular c/o address is only temporary, attacks from the Internet are rather difficult because the attacker does not know when and where his victim gets which c/o address assigned. Packets sent through the access router do not include the IP address of the guest station, only the c/o IP address. Thus, the IP address of the guest station is known only to the access router. The hosting environment, on the other hand, knows the guest's IP address, as well as the assigned c/o IP address. It could therefore easily monitor a guest's IP packets containing passwords or other confidential information or even alter the contents.

Figure 11:
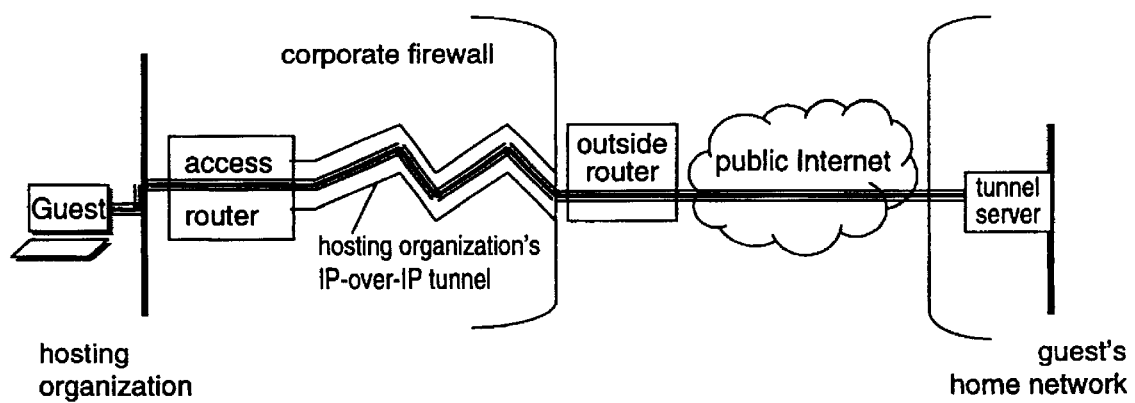
FIG. 11 shows how, using IP connectivity, a guest station creates a secure IP tunnel between himself and a trusted entity, e.g., a VPN server in the regular network of the guest station.

To provide for enhanced security for the guest, the guest may create a secure IP tunnel between the guest station and a router that exists in a trusted environment such as the guest station's home network. Such a router is depicted in FIG. 11 as a tunnel server. The creation of a secure IP tunnel between the guest station and a tunnel server in a trusted environment has the additional advantage that the tunnel emulates a "long wire", which connects the guest with his home network as if he were actually at home. All the traffic from the guest station is released at the home network segment; all traffic from the home network segment that is destined for the guest can be received by the guest.

This embodiment of the invention requires support from the guest's home network. In particular, the home network must support IP tunnels with mutual endpoint authentication and data encryption. One of the disadvantages of this technique is that Windows 95, 98, and NT do not support routing at the guest's station. All traffic from the guest is routed through the same tunnel, what creates unnecessary detours for traffic to nearby destinations. On a LINUX system, for instance, the guest could create additional secure tunnels to other trusted routers in the Internet. Those additional tunnels could be used as alternative routes for outbound traffic.

As shown in FIG. 11, the guest uses the IP connectivity provided by the access router according to the second embodiment described above, and the guest then creates a secure IP tunnel between the guest station and a trusted entity such as a VPN server in his home network (i.e., the tunnel server).

To accommodate a guest station that uses one of Microsoft's Windows operating systems, a practical implementation of this third embodiment of the invention preferably uses a PPP (6) based tunneling technology that uses the Microsoft Challenge Handshake protocol (MS-Chap) for tunnel endpoint authentication, and Microsoft Point-to-Point Encryption (MPPE) (8) for traffic encryption. Furthermore, the Point-to-Point Transport Protocol (PPTP) (7) is preferably used for initiating and controlling the tunnel, as well as for exchanging PPP packets between the two tunnel endpoints. A major advantage of this approach is that all components are already available in the aforementioned Microsoft systems. In addition, since those protocols are standardized by the IETF, the proposed solution is also compatible with other operating systems.

Therefore, if the guest uses a Microsoft system, no new software is required for the guest station to play the role of a tunnel client. On the tunnel server's side, an off-the-shelf Microsoft NT VPN server can be used. In another practical embodiment of this invention, a server with equivalent functionality may preferably be implemented with the LINUX operating system.

After the guest station obtains IP access from his hosting organization, the user of the guest station may initiate the creation of a secure IP tunnel to the home network in a simple manner. For example, the creation of the secure IP tunnel may be initiated by clicking on the Network-Dial-In icon on the desktop in MS Windows. The dial-in procedure is very similar to a dial-in over an analog telephone line, except that an IP address is specified as the remote peer instead of a telephone number. After the guest has pressed the "Connect" button on the dial-in GUI, the client system creates a PPTP connection to the specified tunnel server. The PPTP connection, which is actually a TCP connection to server port 1723, is made possible in the first place by virtue of the activities of the access router to provide IP support. The PPTP packets carry the hosting organization's c/o address when they arrive at the tunnel server. The encapsulated IP packets, however, are not seen by the access router and carry the guest's own IP address. From the access router's point of view, the guest has just the PPTP connection. The described tunnel actually has two transport connections: one TCP connection for tunnel control, and another connection for the exchange of encapsulated packets. The guest, however, may maintain an arbitrary number of connections inside this tunnel.

In a preferred implementation of this embodiment of the invention, a tunnel server runs on a LINUX operating system. The Internet demon inetd automatically launches a new instance of the pptp server when a PPTP connection request arrives (see (9) for details about inetd). The new pptp server instance accepts the incoming TCP connection and uses it, together with the client, as the PPTP control connection. In addition, the tunnel server creates a workload connection between itself and the calling guest. Since this connection is initiated by the PPTP server, rather than by the remote guest, the guest's home network's firewall will not block it. The workload connection is used to carry MPPE PDUs, which contain PPP packets. The first PPP messages are actually control messages for mutual authentication of both tunnel endpoints and for the negotiation of the tunnel's operation modes, including the negotiation of encryption methods and initial keys.

It should be noted that a tunnel is not necessarily symmetric. Different modes of operation can be negotiated for each direction. In the preferred implementation of this embodiment, the tunnel server requires MPPE encryption, but leaves the choice between 40-bit and 128-bit to the guest. It is known (see 10) that 40-bit encryption, as implemented in Microsoft MPPE, is breakable, but this requires tremendous effort.

After initial negotiations are complete, the workload connection is used to exchange the encrypted IP packets between the tunnel server and the remote client. The PPP-part of the tunnel server, which on a LINUX system is a separate process (the PPP demon pppd), will usually proxy-ARP for the remote tunnel endpoint's IP address. Therefore, it intercepts all IP packets that arrive for the guest at his home network segment and forwards them through the secure tunnel. In the opposite direction, packets from the guest that arrive through the secure tunnel at the home network are released in the home network.

Thus, combined with encryption, the guest may himself use end-to-end IP tunnels to protect his traffic against the hosting environment and the public Internet. Moreover, such an IP tunnel may connect the guest with a VPN server at his home network. In this case, the guest would (logically) be connected to his home network segment, using the hosting organization's network and the public Internet only as the implementation base for the IP tunnel, which serves as a virtual cable between guest device and home network segment.

Next, a brief discussion of a pptp server and some practical aspects of tunnel setup will be discussed.

Installation of a PPTP Server on LINUX

In a practical implementation of the invention, a complete LINUX based implementation of a PPTP server with support for Microsoft Point-to-Point Encryption (MPPE) has been created. The server has three parts: the PPP demon, the PPTP server program and the MPPE LINUX kernel module. Each of these three parts will now be discussed.

Installation of PPP

A LINUX system may usually already have a PPP demon (pppd) installed. However, present versions might not support negotiation of parameters for the Microsoft Point-to-Point Encryption protocol (MPPE). Therefore, a new pppd version, may need to be included in the PPTP server. To accomplish this, it is necessary to:

Copy the PPP demon executable file to /usr/sbin/pppd.

Set the owner of /usr/sbin/pppd to root and set the set-uid bit for this file (when a new tunnel is established, pppd needs to invoke the programs route and arp to modify the system's routing and ARP tables, what requires super-user privileges).

Configure pppd through config-file, one option per line. Important options are shown in FIG. 12.

Provide pppd with secrets (passwords) that it might use during the MS-CHAP authentication process to authenticate itself to the caller (remote client) and to verify the caller's identify, such as shown in FIG. 13.

Installation of the PPTP Demon

The PPTP demon waits on TCP port 1723 for incoming calls. When a dial-in request (i.e. a request to establish a new tunnel) is received, it establishes a TCP control connection with the caller, as well as an additional workload connection. If these steps are completed successfully, it launches the PPP demon and, in an endless loop, copies all data that it receives over the tunnel into the PPP demons input. Vice versa, the PPTP demon intercepts the PPP demon's output and sends it through the tunnel to the remote client.

The PPP demon will read the file /etc/ppp/options to configure itself, and start negotiations with its remote counterpart. Even if later encryption is negotiated, the messages exchanged during the negotiation process are not encrypted.

After completion of the negotiation, the PPP demon creates a local network interface (e.g. ppp0 on LINUX) and encapsulates all outbound IP packets into PPP packets, which the PPTP server will intercept from the PPP demon's output and send them through the tunnel, after encapsulating them into GRE (General Routing Encapsulation) packets. Similarly, in the reverse direction, the PPTP demon receives GRE packets from the remote client, retrieves the PPP packets, and forwards them in to the PPP demon's input, where the encapsulated IP packets are retrieved.

The PPTP server (pptp-server) is a single program. It has to be installed e.g. as /usr/sbin/pptp_server. No special privileges are required.

The presently preferred way to run a PPTP server is to configure the internet demon inetd to monitor TCP port 1723 and automatically to start the PPTP demon when a connection request arrives for this port. Assuming the above mentioned location for the PPTP server, the corresponding line in the inetd configuration file could be as shown in FIG. 14.

This, however, assumes, that the name pptp for the PPTP service has been introduced to the system by a line in the /etc/services file such as shown in FIG. 15.

Installation of MPPE Encryption Module

MPPE looks at encryption/decryption as special form of compression/decompression. Compression/decompression algorithms have to be made available to the LINUX kernel via compressor modules. Those can be either statically compiled into the kernel, in which case they are always available, or they can be dynamically loaded with the command insmod mppe_comp.

Setup of Tunnel

The IP tunnel is created between the access router and a machine outside the hosting network's corporate firewall to ensure that all traffic from the guests is safeguarded on its way to the public Internet. Here, safeguarding means ensuring that no packet coming from a guest station can leave its outbound path and reach a station inside the hosting organization's network without going back in through the firewall.

An IP-over-IP tunnel is just one of many possible technologies to establish such a protection mechanism. It is preferred to use such a tunnel because it requires the least overhead. A practical example of establishing such a tunnel will now be described.

To establish an IP-over-IP tunnel between two machines 128.1.1.1 and 128.2.2.2, a pseudo-network-interface tun10 must be created and configured (the IP addresses are those that belong to the Ethernet interfaces that are associated with those tunnel endpoints).

The commands shown in FIG. 16 create a unidirectional tunnel from the machine with the IP address 128.1.1.1 (access router) to the machine with the IP address 128.2.2.2 (outside router).

If the outside router (which also may be referred to as an outpost) does not act as a router for incoming traffic, it has to use proxy-ARP to ensure that it receives inbound traffic for the c/o addresses. The following command carries this out, but it will be appreciated that the assumption is that the outside router is connected through the Ethernet interface eth0 to the network segment that carries the incoming traffic:

arp -s <c/o address> <eth0-hardware-addr> -i eth0 pub

Fourth Embodiment

The fourth embodiment of the invention provides a way to avoid the need for a large pool of IP addresses.

To be capable of supporting a large number of guests, the hosting organization has to reserve sufficiently many c/o addresses (one address per guest). The population of guests and the number of portable devices will grow. The Internet's routing structure makes it difficult. for new c/o addresses to be assigned to a given access router. These two factors can combine to create a serious problem for the hosting organization.

According to this fourth embodiment of the invention, two functions are performed by the c/o address. First, a c/o address ensures that the reply traffic may be routed to the access router instead of to the guest's home network. Second, the unique c/o address identifies for the access router the guest to which a particular reply-packet belongs.

To serve the first purpose, a single c/o address for all guests is sufficient. For the second purpose, by applying a technique called IP masquerading (4), it is possible to use TCP or UDP port numbers to identify the guest that corresponds to an incoming IP packet.

Similar to the home-to-c/o IP address translation, the access router translates the guest's source port numbers to c/o source port numbers that are unique within the router. The c/o IP address will be the same for all guests. The unique source port number, which appears as the destination port number in the reply traffic, can be used to locate the guest service record (which is needed to replace the c/o address with the guest's real/home IP address), and to replace the c/o port number with the original source port number. Up to 6,500 guests can then be supported per c/o address, if there are, on average, not more than 10 simultaneous connections per guest.

IP Masquerading, however, works well only for IP traffic that carries higher level protocols with port numbers, like UDP and TCP. These protocols, however, are exactly the protocols in which guests have the most interest and that are necessary to create the PPTP IP tunnels that was described above. Once a guest has established an IP tunnel, he can again, independently from all other guests, use all 216 port numbers.

Fifth Embodiment

A fifth embodiment of the invention provides for handling of DNS queries in an efficient manner.

DNS, already mentioned above, is a network service that resolves human readable hostnames like www.nec.com to IP addresses such as 143.101.250.20. The guest station's IP configuration will most likely have appointed a couple of DNS servers at the guest's home network, to which all DNS queries are sent. IP packets with DNS queries inside may be recognized by the value 17 in the IP header's protocol field (which indicates UDP) and the destination port number 53 in the UDP header (which indicates DNS).

When the access router according to this embodiment recognizes an IP packet that is a DNS query, the access router replaces the destination IP address of the DNS query with an IP address of a local DNS server. Since DNS is a global network service, it is of no practical consequence that the query actually is answered by a DNS agent of the hosting organization instead of a DNS agent of the guest station's home network, except that using the DNS agent local to the hosting network will work faster and be more efficient.

This is true to the extent that the DNS queries are made for hosts that are visible on the public Internet. It is possible, however, that the guest's home network DNS server maintains entries about machines that are not visible to the outside world. Queries for those hosts could obviously not be answered by the hosting organization's local DNS server. In addition, the hosting organization may have reservations about giving arbitrary guests access to their local DNS server, since those guests could receive information about hosting network hosts that are not supposed to be visible outside the hosting organization's network. Therefore, according to a variation of this fifth embodiment, the capability of redirecting DNS queries to local DNS servers is an option that can be turned off by the hosting organization. In other words, the DNS redirect feature is selectable in the presently preferred embodiment.

To allow for such selectability, the access router may include a control interface. In a practical implementation of the embodiment, this control interface may be an open implementation based on CORBA (5). Such an interface allows remote clients to obtain a list of currently registered guests. In addition, it provides methods for assigning a DNS server to a particular guest, or to turn the DNS-query-redirection feature off.

Because CORBA inherently supports remote access, the hosting organization's network administrator can remotely control an access router. CORBA's built-in security features, like mutual peer authentication and data encryption, protect against unauthorized use of this interface.

Sixth Embodiment

Similar to the fifth embodiment, in which DNS query redirection is provided, this embodiment provides for redirection of print jobs to a local printer or print server. The access router can support this by replacing the IP destination address in packets from the guest station with the IP address of local printers or print servers when a print service request is recognized. Traffic that is associated with the print service may be recognized by the destination port number. According to this embodiment of the invention, the access router provides an open, CORBA-based interface that allows for the assignment of a particular local printer to each guest, or the selective turning of print redirection off, in which case the guest's printer at home would be activated by print service requests.

Seventh Embodiment

The seventh embodiment of the invention provides a GUI for control of guest service record. The GUI includes components for the system administrator of the hosting network, and for the guest using the guest station.

For the Hosting Organization's System Administrator

The hosting organization's system administrator can download a web site from the access router that provides him with a CORBA enabled Java Applet (URL http://<access-router>/GuestIPcontrol.html). This applet comes with a GUI that shows him a list of currently registered guests, their home IP addresses and their assigned c/o address. By selecting an item from this list, the systems administrator can query details about a particular guest, for instance the time when he was registered or the list of local DNS servers and local printers that the guest may choose between. The latter two lists can now, on a per-guest basis, be edited by the systems administrator, giving a particular guest either more choices or to reduce his choices. In addition, the system administrator is privileged to select one of the available choices on behalf of the selected guest.

For the Guest

Within the limits established by the hosting organization's system administrator, the guest may open the web page http://<access-router>/GuestIP.html, which will provide him with a CORBA enabled Java Applet that shows him the current setting for redirection of DNS queries to local servers, as well as for the redirection of printer requests to local printers.

Some performance considerations will now be discussed.

Performance

The major cost for performing the c/o-address translation in the access router is the lookup of the guest's service record, and the re-computation of the IP/UDP/TCP/ICMP header's checksum. The guest's service record may need to be located for every IP packet from or to the guest. A lookup is based on the guest's home address or c/o address, depending on the traffic direction. The cost for this operation is $O(\log(n))$, where n is the number of registered guests. Since n is usually small, less than 20, the forwarding delay incurred by this operation is negligible.

The cost for re-computing the header checksums, which are the ones-complement sums of the 16-bit one-complements of the entire IP packet excluding the checksum field itself, is linearly proportional to the IP packet size. However, since only the source IP address field is changed, this cost is constant when re-using the IP checksum that was previously computed by the guest.

It will be appreciated that IP guest support using an access router according to any of the foregoing embodiments of the invention is provided at the network edge, where throughput requirements are not nearly as severe as in the core network.

Conclusions

The Internet is the dominant network of this time. Due to the rapid increase in the number of users and high level services, being connected to it becomes even more important every day. At the same time, the physical size of network end-devices such as computers is rapidly decreasing, which makes them (potentially) portable. This includes not only laptops, but also small printers, input/scanning devices, cameras, and many other useful gadgets coming in the near future. Those portable devices will have their own unique IP addresses, which will provide them with globally unique identities. The invention allows these devices easily and simply to receive IP services even at a temporary location, and solves the problem of hosting a guest station.

The inventive IP access described herein allows a hosting organization to associate a local c/o address with a portable device. Without requiring any support or change at the portable device (i.e., the guest station), an intelligent access router transparently replaces the portable device's IP-address (home address) with an associated c/o address that specifies the device's current location. This allows returning traffic to reach the portable device's current location. Since this address translation is reversed for incoming traffic, the entire process remains transparent to the portable device.

The hosting organization can use IP tunnels to effectively protect itself against malicious guests. In addition, the guest (i.e. portable device) can use secure IP tunnels to protect itself against the hosting organization and the public Internet. Finally, IP masquerading significantly reduces the number of c/o addresses needed to support large numbers of portable devices at an access point.

Furthermore, flexible mechanisms for adapting guests to local network configurations, like addresses of DNS servers or printers, ease the work of the local network administrator because he does not have to push information about new or temporarily different network configurations into every user's local system.

We claim:

1. An access routing method for an access router of a hosting network to provide IP service to a guest station, comprising:
  intercepting from said guest station an original outbound IP packet having an original source IP address and a destination IP address;
  associating said original source IP address with a care-of address;
  providing a modified outbound IP packet based on said original outbound IP packet, with said care-of address instead of said original source IP address; and
  sending said modified outbound IP packet through an IP tunnel to a station outside said hosting network even when said destination address indicates an address of said hosting network.

2. The access routing method as set forth in claim 1, wherein said intercepting comprises:
  detecting an ARP request sent from said guest station, said ARP request being addressed to a station other than said access router;
  sending to said guest station a proxy-ARP reply to said ARP request, wherein said proxy-ARP reply includes a hardware address of said access router.

3. The access method as set forth in claim 1, wherein said step of associating said original source IP address with said care-of address further comprises associating a source port number of said guest station with a care-of port number unique to said guest station.

4. The access routing method as set forth in claim 1, further comprising a step of DNS redirection including:
  intercepting a DNS query packet;
  replacing a destination IP address of said intercepted DNS query packet with an IP address of a local DNS server to provide a modified DNS query packet; and
  sending said modified DNS query packet to said local DNS server.

5. The access routing method as set forth in claim 4, wherein said step of DNS redirection is selectable.

6. The access routing method as set forth in claim 1, further comprising a step of print job redirection including:
  intercepting a print job packet;
  replacing a destination IP address of said intercepted print job packet with an IP address of a local printer to provide a modified print job packet; and
  sending said modified print job packet to said local printer.

7. An access routing method for an access router of a hosting network to provide IP service to a guest station, comprising:
  intercepting from said guest station an original outbound IP packet having an original source IP address and a destination IP address by:
    detecting an ARP request sent from said guest station, said ARP request being addressed to a station other than said access router, and
    sending to said guest station a proxy-ARP reply to said ARP request, wherein said proxy-ARP reply includes a hardware address of said access router;
  associating said original source IP address with a care-of address; and
  providing a modified outbound IP packet based on said original outbound IP packet, with said care-of address instead of said original source IP address;
  wherein said step of sending to said guest station said proxy-ARP reply is performed only when no ARP reply to said ARP request is detected by said access router within a predetermined router ARP wait period.

8. The access routing method as set forth in claim 7, further comprising sending said modified outbound IP packet through an IP tunnel to an outside station.

9. An access routing method for an access router of a hosting network to provide IP service to a guest station, comprising:
  intercepting from said guest station an original outbound IP packet having an original source IP address and a destination IP address;
  associating said original source IP address with a care-of address; and
  providing a modified outbound IP packet based on said original outbound IP packet, with said care-of address instead of said original source IP address; and
  a step of print job redirection including:
    intercepting a print job packet;
    replacing a destination IP address of said intercepted print job packet with an IP address of a local printer to provide a modified print job packet; and
    sending said modified print job packet to said local printer;
  wherein said step of print job redirection is selectable by said hosting network.

10. A system for providing IP-layer access for a guest station, said system comprising:
  a guest station with a guest station IP address;
  a hosting network, in communication with said guest station, including a firewall;
  an IP packet released by said guest station; and
  an access router participating in said hosting network;
  wherein:
    said access router intercepts said IP packet released by said guest and provides said guest with IP access; and
    said access router passes said intercepted IP packet through an IP tunnel to a station outside said firewall of said hosting network even when a destination address of said IP packet released by said guest indicates an address of said hosting network.

11. The system for IP-layer access as set forth in claim 10, wherein said access router intercepts said released IP packet.

12. The system for IP-layer access as set forth in claim 11, wherein said access router uses proxy ARP to intercept said released IP packet.

13. The system for IP-layer access as set forth in claim 10, wherein said access router modifies said released IP packet by replacing said guest station IP address with a care-of IP address.

14. The system for IP-layer access as set forth in claim 13, wherein said access router uses IP masquerading to replace said guest station IP address with said care-of IP address.

15. The system for IP-layer access as set forth in claim 10, wherein said access router records an association between said guest station IP address and care-of address in a guest service record.

16. A computer system adapted to provide a guest station IP access when connected to a hosting network, comprising:
  a processor, and
  a memory including software instructions adapted to enable the computer system to perform the steps of:
    intercepting from said guest station an original outbound IP packet having an original source IP address and a destination IP address;

associating said original source IP address with a care-of address;

providing a modified outbound IP packet based on said original outbound IP packet, with said care-of address instead of said original source IP address; and sending said modified outbound IP packet through an IP tunnel to a station outside said hosting network even when said destination address indicates an address of said hosting network.

17. The computer system adapted to provide a guest station IP access as set forth in claim 16, wherein said intercepting comprises:

detecting an ARP request sent from said guest station, said ARP request being addressed to a station other than said access router;

sending to said guest station a proxy-ARP reply to said ARP request, wherein said proxy-ARP reply includes a hardware address of said access router.

18. The computer system adapted to provide a guest station IP access as set forth in claim 16, wherein said step of associating said original source IP address with said care-of address further comprises associating a source port number of said guest station with a care-of port number unique to said guest station.

19. A computer system adapted to provide a guest station IP access when connected to a hosting network, comprising:

a processor, and a memory including software instructions adapted to enable the computer system to perform the steps of:

intercepting from said guest station an original outbound IP packet having an original source IP address and a destination IP address by:

detecting an ARP request sent from said guest station, said ARP request being addressed to a station other than said access router, and sending to said guest station a proxy-ARP reply to said ARP request, wherein said proxy-ARP reply includes a hardware address of said access router;

associating said original source IP address with a care-of address; and providing a modified outbound IP packet based on said original outbound IP packet, with said care-of address instead of said original source IP address;

wherein said sending to said guest station of said proxy ARP reply is performed only when no ARP reply to said ARP request is detected within a predetermined router ARP wait period.

20. The computer system adapted to provide a guest station IP access as set forth in claim 19, further comprising software instructions adapted to enable the computer system to perform the step of sending said modified outbound IP packet through an IP tunnel to an outside station.

21. A computer program product for enabling a computer to provide a guest station IP access when connected to a hosting network, comprising:

software instructions for enabling the computer to perform predetermined operations, and a computer readable medium bearing the software instructions;

the predetermined operations including the steps of:

intercepting from said guest station an original outbound IP packet having an original source IP address and a destination IP address;

associating said original source IP address with a care-of address;

providing a modified outbound IP packet based on said original outbound IP packet, with said care-of address instead of said original source IP address; and sending said modified outbound IP packet through an IP tunnel to a station outside said hosting network even when said destination address indicates an address of said hosting network.

22. The computer program product for enabling a computer to provide a guest station IP access according to claim 21, wherein said intercepting comprises:

detecting an ARP request sent from said guest station, said ARP request being addressed to a station other than said access router;

sending to said guest station a proxy-ARP reply to said ARP request, wherein said proxy-ARP reply includes a hardware address of said access router.

23. The computer program product for enabling a computer to provide a guest station IP access according to claim 21, wherein said step of associating said original source IP address with said care-of address further comprises associating a source port number of said guest station with a care-of port number unique to said guest station.

24. A computer program product for enabling a computer to provide a guest station IP access when connected to a hosting network, comprising:

software instructions for enabling the computer to perform predetermined operations, and a computer readable medium bearing the software instructions;

the predetermined operations including the steps of:

intercepting from said guest station an original outbound IP packet having an original source IP address and a destination IP address by:

detecting an ARP request sent from said guest station, said ARP request being addressed to a station other than said access router, and sending to said guest station a proxy-ARP reply to said ARP request, wherein said proxy-ARP reply includes a hardware address of said access router;

associating said original source IP address with a care-of address; and providing a modified outbound IP packet based on said original outbound IP packet, with said care-of address instead of said original source IP address;

wherein said sending to said guest station of said proxy ARP reply is performed only when no ARP reply to said ARP request is detected within a predetermined router ARP wait period.

25. The computer program product for enabling a computer to provide a guest station IP access according to claim 24, wherein said predetermined operations further comprise the step of sending said modified outbound IP packet through an IP tunnel to an outside station.

26. A user interface, for the control of IP access of guest stations connected to a hosting network, said user interface being invocable by an application program and comprising:

a first display region displaying a list of currently registered guest stations connected to said hosting network;

for one of said guest stations, display regions showing a corresponding home IP address of said guest station and a care-of address associated with said guest station;

a first user activatable control showing, when activated, the time when a selected one of said guest stations became registered;

a second display region showing a list of local DNS servers and local printers selectable with respect to said guest stations;

a second user activatable control for selecting, when activated, one of said local printers for print job redirection of print job packets for one or more of said guest stations; and a third user activatable control for selecting, when activated, one of said local DNS servers for DNS query redirection of DNS query packets for one or more of said guest stations.

* * * * *